US008503194B2

(12) United States Patent
Moussaoui et al.

(10) Patent No.: US 8,503,194 B2
(45) Date of Patent: Aug. 6, 2013

(54) BIDIRECTIONAL SIGNAL CONVERSION

(75) Inventors: Zaki Moussaoui, San Carlos, CA (US); Jifeng Qin, San Jose, CA (US)

(73) Assignee: Intersil Americas LLC, Milpitas, CA (US)

( * ) Notice: Subject to any disclaimer, the term of this patent is extended or adjusted under 35 U.S.C. 154(b) by 378 days.

(21) Appl. No.: 12/899,915

(22) Filed: Oct. 7, 2010

(65) Prior Publication Data
US 2011/0149610 A1    Jun. 23, 2011

Related U.S. Application Data

(60) Provisional application No. 61/288,798, filed on Dec. 21, 2009, provisional application No. 61/319,842, filed on Mar. 31, 2010.

(51) Int. Cl.
*H02M 3/335* (2006.01)
*H02M 3/24* (2006.01)

(52) U.S. Cl.
USPC .............................................. 363/17; 363/96

(58) Field of Classification Search
USPC .................... 363/16, 17, 97, 98, 131, 132
See application file for complete search history.

(56) References Cited

U.S. PATENT DOCUMENTS

| 4,184,197 A | 1/1980 | Cuk et al. |
| 4,257,087 A | 3/1981 | Cuk |
| 4,274,133 A | 6/1981 | Cuk et al. |
| 5,510,974 A | 4/1996 | Gu et al. |
| 6,294,900 B1 | 9/2001 | Greenwood et al. |
| 6,330,170 B1 | 12/2001 | Wang et al. |
| 6,445,599 B1 | 9/2002 | Nguyen |
| 6,462,962 B1 | 10/2002 | Cuk |

(Continued)

FOREIGN PATENT DOCUMENTS

WO    2009012778 A2    1/2009

OTHER PUBLICATIONS

International Preliminary Report on Patentability issued Jun. 26, 2012 for PCT/US2010/061306 filed Dec. 20, 2010, Applicant Intersil Americas Inc.

(Continued)

*Primary Examiner* — Matthew Nguyen
(74) *Attorney, Agent, or Firm* — Paul A. Bernkopf; Graybeal Jackson LLP; Bryan A. Santarelli

(57) ABSTRACT

An embodiment of a multidirectional signal converter includes first and second converter nodes, a transformer, and first and second stages. The transformer includes first and second windings, and the first stage is coupled between the first converter node and the first winding of the transformer. The second stage includes a first node coupled to the second converter node, a second node coupled to a node of the second winding of the transformer, and a filter node, is operable as a boost converter while current is flowing out from the second converter node, and is operable as a buck converter while current is flowing out from the first converter node. For example, in an embodiment, such a multidirectional signal converter may be a bidirectional voltage converter that handles power transfer between two loads. Such a voltage converter may have improved conversion efficiency and a smaller size and lower component count as compared to a conventional multidirectional voltage converter. Furthermore, such a voltage converter may be operable with a common switching scheme regardless of the direction of power transfer, and without the need for an indicator of the instantaneous direction of power flow.

24 Claims, 11 Drawing Sheets

(56) References Cited

U.S. PATENT DOCUMENTS

| | | |
|---|---|---|
| 6,574,125 B2 | 6/2003 | Matsukawa et al. |
| 6,717,388 B2 | 4/2004 | Smidt et al. |
| 6,836,414 B1 | 12/2004 | Batarseh et al. |
| 6,876,556 B2 | 4/2005 | Zhu et al. |
| 7,072,162 B2 | 7/2006 | D'Amato |
| 7,433,207 B2 | 10/2008 | Thor et al. |
| 7,638,904 B2 * | 12/2009 | Shoji et al. .............. 307/154 |
| 7,692,935 B2 | 4/2010 | Yamauchi et al. |
| 7,796,406 B2 * | 9/2010 | Lev .............. 363/21.02 |
| 7,830,686 B2 | 11/2010 | Zeng et al. |
| 7,848,118 B2 | 12/2010 | Shimada et al. |
| 7,911,810 B2 | 3/2011 | Shimada et al. |
| 7,936,573 B2 | 5/2011 | Yamauchi et al. |
| 8,130,515 B2 | 3/2012 | Shimada et al. |
| 8,130,524 B2 | 3/2012 | Lee et al. |
| 2001/0004205 A1 | 6/2001 | Miller |
| 2002/0021574 A1 | 2/2002 | Ishii et al. |
| 2004/0071004 A1 | 4/2004 | King |
| 2006/0139823 A1 | 6/2006 | Shoji et al. |
| 2006/0158908 A1 | 7/2006 | Usui |
| 2007/0139975 A1 | 6/2007 | Yamauchi et al. |
| 2008/0309301 A1 | 12/2008 | Shimada et al. |
| 2009/0059622 A1 | 3/2009 | Shimada et al. |
| 2009/0201700 A1 | 8/2009 | Aso et al. |
| 2010/0124086 A1 | 5/2010 | Chen |
| 2011/0149609 A1 | 6/2011 | Moussaoui et al. |
| 2011/0149611 A1 | 6/2011 | Moussaoui et al. |
| 2012/0153729 A1 * | 6/2012 | Song et al. .............. 307/82 |

OTHER PUBLICATIONS

International Preliminary Report on Patentability issued Jun. 26, 2012 for PCT/US2010/061318, filed Dec. 20, 2010, Applicant Intersil Americas Inc.

International Preliminary Report on Patentability issued Jun. 26, 2012 for PCT/US2010/061310 filed Dec. 20, 2010, Applicant Intersil Americas Inc.

International Search Report issued Jul. 29, 2011 for PCT/US2010/061318, filed Dec. 20, 2010. Applicant Intersil Americas Inc.

International Search Report issued Aug. 30, 2011 for PCT/US2010/061306, filed Dec. 20, 2010. Applicant Intersil Americas Inc.

International Search Report issued Aug. 30, 2011 for PCT/US2010/061310 filed Dec. 20, 2010. Applicant Intersil Americas Inc.

Chan, H.L. et al., "An Extended Load Range ZCS-ZVS Bi-Directional Phase-Shifted DC-DC Converter," 28th International Conference on Power Electronics and Variable Speed Drives (CP475) London, UK; 2000:74-79, Sep. 18-19 2000.

Intersil, "Advanced Double-Ended PWM Controller", ISL6742, Data Sheet, Oct. 31, 2008 FN9183.2, pp. 18.

* cited by examiner

United States Patent US 8,503,194 B2

BIDIRECTIONAL SIGNAL CONVERSION

CLAIM OF PRIORITY

The present application claims the benefit of copending U.S. Provisional Patent Application Ser. No. 61/288,798 filed on Dec. 21, 2009; the present application also claims the benefit of copending U.S. Provisional Patent Application Ser. No. 61/319,842 filed on Mar. 31, 2010; all of the foregoing applications are incorporated herein by reference in their entireties.

RELATED APPLICATION DATA

This application is related to U.S. patent application Ser. No. 12/899,800, entitled BIDIRECTIONAL SIGNAL CONVERSION filed Oct. 7, 2010, and is related to U.S. patent application Ser. No. 12/899,977, entitled BIDIRECTIONAL POWER CONVERSION filed Oct. 7, 2010, all of the foregoing applications are incorporated herein by reference in their entireties.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

An embodiment of a bidirectional signal converter includes first and second converter nodes, a transformer, and first and second stages. The transformer includes first and second windings, and the first stage is coupled between the first converter node and the first winding of the transformer. The second stage includes a first node coupled to the second converter node, a second node coupled to a node of the second winding of the transformer, and a filter node, is operable as a boost converter while current is flowing out from the second converter node, and is operable as a buck converter while current is flowing out from the first converter node.

For example, in an embodiment, such a bidirectional signal converter may be a bidirectional voltage converter that handles power transfer between two loads. Such a voltage converter may have improved conversion efficiency, and a smaller size and lower component count, as compared to a conventional bidirectional voltage converter. Furthermore, such a voltage converter may be operable with a common switching scheme regardless of the direction of power transfer, and without the need for an indicator of the instantaneous direction of power flow.

DETAILED DESCRIPTION

Bidirectional signal converters, such as bidirectional voltage converters, may be used in applications where power is transferred back and forth between multiple loads. For example, an automotive system such as a gas-electric hybrid vehicle may have a higher-voltage battery for powering the electric drive motors (e.g., one motor per wheel), a lower-voltage battery for powering every other electrically powered component (e.g., lights, radio) of the automobile, and a bidirectional DC-DC voltage converter coupled between these two batteries. During a period of vehicle acceleration, the bidirectional converter may provide power from the lower-voltage battery to maintain a charge on the higher-voltage battery; conversely, during a period of regenerative braking, the power flow may reverse such that the bidirectional converter may provide power from the higher-voltage battery (which is being recharged by the electric drive motors operating as generators) to recharge the lower-voltage battery.

Unfortunately, such bidirectional converters may have problems including poor conversion efficiency, large size and high component count, the need for an indicator of the instantaneous direction of power flow, and a respective switching scheme for each direction of power transfer.

Figure 1:
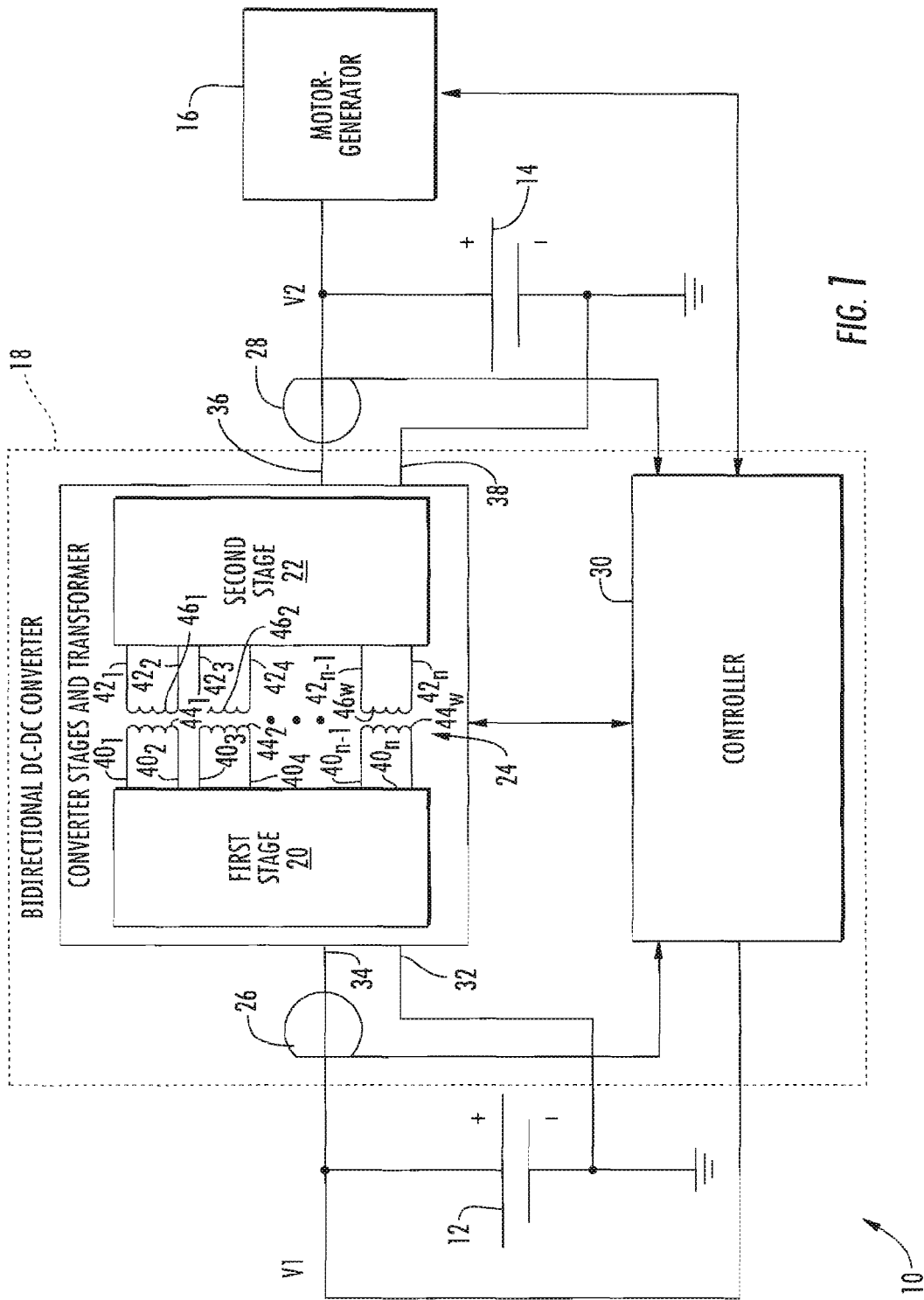
FIG. 1 is a schematic diagram of an embodiment of a bidirectional voltage converter and the sources/loads between which the converter is operable to transfer power.

FIG. 1 is a schematic diagram of an embodiment of a portion of a system 10 that includes sources/loads 12 and 14, at least one motor/generator 16 that selectively receives power from and provides power to at least one of the sources/loads, and a bidirectional DC-DC voltage converter 18 that transfers power between the two sources/loads. For example, the system 10 may be an automotive system such as a gas-electric hybrid vehicle. As discussed below, an embodiment of the bidirectional converter 18 may have improved conversion efficiency, a smaller size, and a lower component count as compared to a conventional bidirectional voltage converter. Furthermore, an embodiment of the converter 18 may be operable with a switching scheme that is at least approximately independent of the direction of power transfer, and without the need for an indicator of the instantaneous direction of power flow.

In an embodiment, the sources/loads 12 and 14 are respective first and second batteries, each of which acts as a power source while providing a current to, e.g., charge the other battery, and which acts as a load while receiving a current, e.g., a charging current from the other battery. The first and second batteries 12 and 14 generate respective first and second voltages $V_1$ and $V_2$, which may be equal or unequal. For example, if the system 10 is an automotive system such as a gas-electric hybrid vehicle, then the first battery 12 may be a lead-acid battery that generates a lower voltage in the range of approximately 7 Volts (V)-16 V to power, e.g., the vehicle's lights and radio, and the second battery 14 may be a lithium-ion or nickel-metal-hydride (NiMH) battery that generates a higher voltage in the range of approximately 100 V-500 V to power the at least one motor/generator 16 while it is operating as a motor, e.g., to rotate at least one wheel of the vehicle.

The motor/generator 16 is operable as a motor while it is receiving power from at least one of the sources/loads 12 and 14, and operates as a generator while it is providing power to at least one of the sources/loads. For example, if the system 10 is hybrid vehicle and the sources/loads 12 and 14 are batteries, then during vehicle acceleration the motor/generator 16 may act as a motor by receiving power from at least one of the batteries to rotate one or more of the vehicle wheels, and during vehicle braking the motor/generator may act as a generator to recharge at least one of the batteries (sometimes called "regenerative braking").

The bidirectional voltage converter 18 includes first and second bidirectional-converter stages 20 and 22, a transformer 24, first and second current sensors 26 and 28, a controller 30, and first, second, third, and fourth converter nodes 32, 34, 36, and 38 respectively coupled to the sources/loads 12 and 14.

The first and second stages 20 and 22 each include at least one phase $40_1$-$40_n$, respectively, and operate to bidirectionally transfer power between the source/loads 12 and 14 in response to the controller 30; and as discussed below, the converter stages may also operate to step up, step down, or regulate at least one of the voltages $V_1$ and $V_2$ at the converter nodes 34 and 36 in response to the controller. For example, assume that the controller 30 causes the converter stages 20 and 22 to regulate voltage $V_2$ to a level that is higher than the voltage $V_1$. While power is flowing from the source/load 14 (acting as a source) to the source/load 12 (acting as a load) during a first mode of operation, the first converter stage 20 may effectively step down the voltage $V_2$ to the voltage $V_1$ (the transformer 24 may assist in this stepping down as discussed below), and the first and second converter stages may cooperate to regulate the flow of current into the converter node 36 so as to regulate the voltage $V_2$. And while power is flowing from the source/load 12 (acting as a source) to the source/load 14 (acting as a load) during a second mode of operation, the first stage 20 may effectively step up, or boost, the voltage $V_1$ to the voltage $V_2$ (the transformer 24 may assist in this stepping up as discussed below), and the first and second converter stages may cooperate to regulate the flow of current out from the converter node 36 (i.e., from the second stage 22 toward the sources/loads 14) so as to regulate the voltage $V_2$.

The transformer 24 provides galvanic isolation between the sources/loads 12 and 14, and may also assist the first and second converter stages 20 and 22 with stepping up/down $V_1$ and $V_2$. The transformer 24 includes at least one first-stage winding $44_1$-$44_w$, and at least one second-stage winding $46_1$-$46_w$. As discussed below in conjunction with FIG. 2, in an embodiment, the transformer 24 includes one respective first-stage winding 44 and second-stage winding 46 for each pair of converter phases 40. The turns ratio between the windings 44 and 46 determines the level to which the transformer 24 steps up/down $V_1$ and $V_2$. For example, a turns ratio of 2:1 would cause the transformer 24 to generate across a second-stage winding 46 a voltage that is twice the voltage that is across a corresponding first-stage winding 44 while power is flowing from the source/load 12 to the source/load 14; likewise, the same turns ratio of 2:1 would cause the transformer to generate across a first-stage winding 44 a voltage that is ½ the voltage across a corresponding second-stage winding 46 while power is flowing from the source/load 14 to the source/load 12.

But because the efficiency (i.e., the ratio of power out to power in) of a transformer may decrease as the turns ratio increases, as discussed below in conjunction with FIG. 2, the first and second converter stages 20 and 22 may be designed to allow the transformer 24 to have a turns ratio as low as approximately 1:1 for improved efficiency of the bidirectional converter 18.

Still referring to FIG. 1, the first and second current sensors 26 and 28 allow the controller 30 to monitor the currents to the sources/loads 12 and 14. For example, where the sources/loads 12 and 14 are batteries, the first and second current sensors 26 and 26 may allow the controller 30 to control at least one charging parameter (e.g., current) of the batteries, and to prevent overcharging of the batteries.

The controller 30 may regulate at least one of the voltages $V_1$ and $V_2$, and, where the sources/loads 12 and 14 are batteries, may control the charging of these batteries, by controlling the operation of the first and second converter stages 20 and 22. For example, the controller 30 may control the switching duty cycle of at least one of the converter stages 20 and 22 as discussed below in conjunction with FIG. 2. Furthermore, the controller 30 may control the converter stages 20 and 22 without "knowing" the direction of power flow. That is, an embodiment of the controller 30 need not receive a signal that indicates the instantaneous direction of the power flow.

Still referring to FIG. 1, the operation of an embodiment of the system 10 is described, where, for example purposes, the system is an automotive system such as a hybrid vehicle, the sources/loads 12 and 14 are batteries (e.g., lead-acid and lithium-ion batteries, respectively), the voltage $V_2$ is regulated, and the voltage $V_1$ is unregulated (although the controller 30 may prevent overcharging of the battery 12). Furthermore, the periods of charging and discharging described below are assumed to be short enough such that the charges on the batteries 12 and 14 remain sufficiently high so that another generator (not shown, but typically run by a gasoline engine in the vehicle) need not be activated to recharge them.

During an accelerating mode of operation where the motor/generator 16 acts as a motor to rotate at least one of the wheels of the automotive system 10, the battery 14 provides a load current that drives the motor/generator.

After a period of time that depends on the level of charge on the battery 14, the voltage $V_2$ begins to decrease below its regulated value.

In response to the voltage $V_2$ decreasing below its regulated value, the controller 30 adjusts the duty cycle of the first and second converter stages 20 and 22 such that these stages transfer power from the battery 12 to the battery 14 so as to maintain $V_2$ at approximately its regulated value. Specifically, the controller 30 causes the first and second converter stages 20 and 22 to sink a discharge current from the battery 12 into the first converter node 34, to convert this discharge current into a charging current, and to source this charging current from the second converter node 36 so as to maintain the voltage $V_2$ at its regulated value by replenishing the second battery 14 with an amount of charge that is approximately equal to the charge that the battery 14 is providing to drive the motor/generation 16.

The charging of the second battery 14 by the first battery 12 may continue as long as the motor/generator 16 requires current to drive the at least one wheel of the vehicle 10.

Next, the driver (not shown in FIG. 1) of the vehicle 10 applies the brakes such that the vehicle enters into what is often called a regenerative-braking mode.

This causes the current being drawn by the motor/generator 16 from the battery 14 to decrease toward zero rather rapidly.

As the current drawn by the motor/generator 16 decreases, the controller 30 maintains $V_2$ at its regulated level by adjusting the duty cycle of the first and second converter stages 20 and 22 such that the current flowing into the converter node 34 from the battery 12, and the current flowing out from the converter node 36, decrease to compensate for the decrease in the current being drawn by the motor/generator 16.

If the driver (not shown in FIG. 1) of the vehicle 10 continues to apply the brakes, then, at some point, the motor/generator 16 begins to source a current into the battery 14. Therefore, this current from the motor/generator 16 recharges the battery 14.

In response to the current generated by the motor/generator 16, the controller 30 continues to maintain $V_2$ at its regulated level by adjusting the duty cycle of the first and second converter stages 20 and 22 such that the current flowing into the converter node 34 from the battery 12, and the current flowing out from the converter node 36 to the battery 14, further decrease to compensate for the current being generated by the motor/generator 16.

If the driver (not shown in FIG. 1) of the vehicle 10 still continues to apply the brakes, then, at some point, the current needed to recharge the battery 14 becomes less than the current being generated by the motor/generator 16. Therefore, this "excess current" from the motor/generator 14 causes the voltage $V_2$ to increase above its desired level unless this excess current is compensated for.

To maintain the voltage $V_2$ at its regulated level in response to the excess current being generated by the motor/generator 16, the controller 30 adjusts the duty cycle of the first and second converter stages 20 and 22 such that the first and second converter stages convert this excess current into a current for charging the battery 12. That is, the excess current from the motor/generator 16 flows into the converter node 36, and the controller 30 causes the first and second converter stages 20 and 22 to convert this excess current into a charging current that flows out from the converter node 34 and into the battery 12.

Therefore, the bidirectional converter 18 allows the motor/generator 16 to recharge not only the battery 14, but the battery 12 as well.

If the driver (not shown in FIG. 1) of the vehicle 10 still continues to apply the brakes, then, at some point, the voltage $V_1$ across the recharging battery 12 may equal or exceed a first charging-threshold voltage, thus indicating that the charging current into the battery 12 is to be reduced to a "trickle" so as to apply a "trickle charge" to the battery—trickle charging a battery may prevent damage to the battery caused by, e.g., overcharging.

Therefore, the controller 30 may generate a trickle current to continue the recharging of the battery 12 in a number of ways.

For example, the controller 30 may adjust the duty cycle of the first and second converter stages 20 and 22 so that the charging current flowing out from the node 34 and being monitored by the current sensor 26 does not exceed a specified trickle-value. Or, the controller 30, in addition to regulating the voltage $V_2$, may also regulate the voltage $V_1$ to a specified level such that the battery 12 is recharged via an approximately constant voltage applied across the battery.

But limiting the current flowing out from the convert node 34 or regulating the voltage $V_1$ may allow the excess current from the motor/generator 16 to increase $V_2$ above its regulated level, because now the converter 18 does "absorb" all of this excess current.

Therefore, the controller 30 may deactivate the motor/controller 16 from generating a current, may control an optional circuit (not shown in FIG. 1) between the motor/generator and the battery 14 to limit or block the current from the motor/generator, or may control another optional circuit (not shown in FIG. 1) between the converter 18 and the battery 12 to generate the trickle current and to divert any additional current flowing out from the converter node 34 to a dissipative load such as a resistor.

If the driver (not shown in FIG. 1) of the vehicle 10 still continues to apply the brakes, then, at some point, the voltage $V_1$ on the recharging battery 12 may equal or exceed a fully-charged threshold voltage, thus indicating that the charging current into the battery 12 is to be reduced to zero, i.e., terminated.

Therefore, the controller 30 may terminate the current flowing into the battery 12 in a number of ways.

For example, the controller 30 may adjust the duty cycle of the first and second converter stages 20 and 22 so that zero current flows out from the converter node 34.

But this may allow the excess current from the motor/generator 16 to increase the voltage $V_2$ above its regulated level, because now the converter 18 does not absorb all of this excess current.

Therefore, the controller 30 may deactivate the motor/controller 16 from generating a current, may control an optional circuit (not shown in FIG. 1) between the motor/generator and the battery 14 to limit or block the current from the motor/generator, or may control another optional circuit (not shown in FIG. 1) between the converter 18 and the battery 12 to block current from entering the battery 12 and to divert any current flowing out from the converter node 34 to a dissipative load such as a resistor.

Still referring to FIG. 1 and to the above-described embodiment of the system 10 and to the above-described example of operation of the system, at no time does the above-described embodiment of the controller 30 require a signal from, for example, a microprocessor, to notify the controller of the direction of the converter-node 36 current. By regulating the voltage $V_2$ regardless of the power-transfer direction, the controller 30 allows a smooth transition of the converter-node-34 and converter-node 36 currents from one direction to the other.

Furthermore, the above-described embodiment of the controller 30 need not change the switching scheme (e.g., switching timing, duty cycle) of the first and second converter stages 20 and 22 in dependence on the power-transfer direction. Instead, the controller 30 may adjust the duty cycle of the converter stages 20 and 22 as needed to regulate the voltage $V_2$ to a desired level.

Still referring to FIG. 1, alternate embodiments of the system 10 are contemplated. For example, instead of a single controller 30, the bidirectional converter 18 may include multiple controllers to perform the above-described actions. Furthermore, although described as being positive, at least one of the voltages $V_1$ and $V_2$ may be negative. Moreover, the system 10 may be other than an automotive system. In addition, at least one of the sources/loads 12 and 14 may be other than a battery, for example a bank of super capacitors. Furthermore, the controller 30 may control the charging of the battery 14 in a manner similar to that in which the controller controls the charging of the battery 12.

Figure 2:
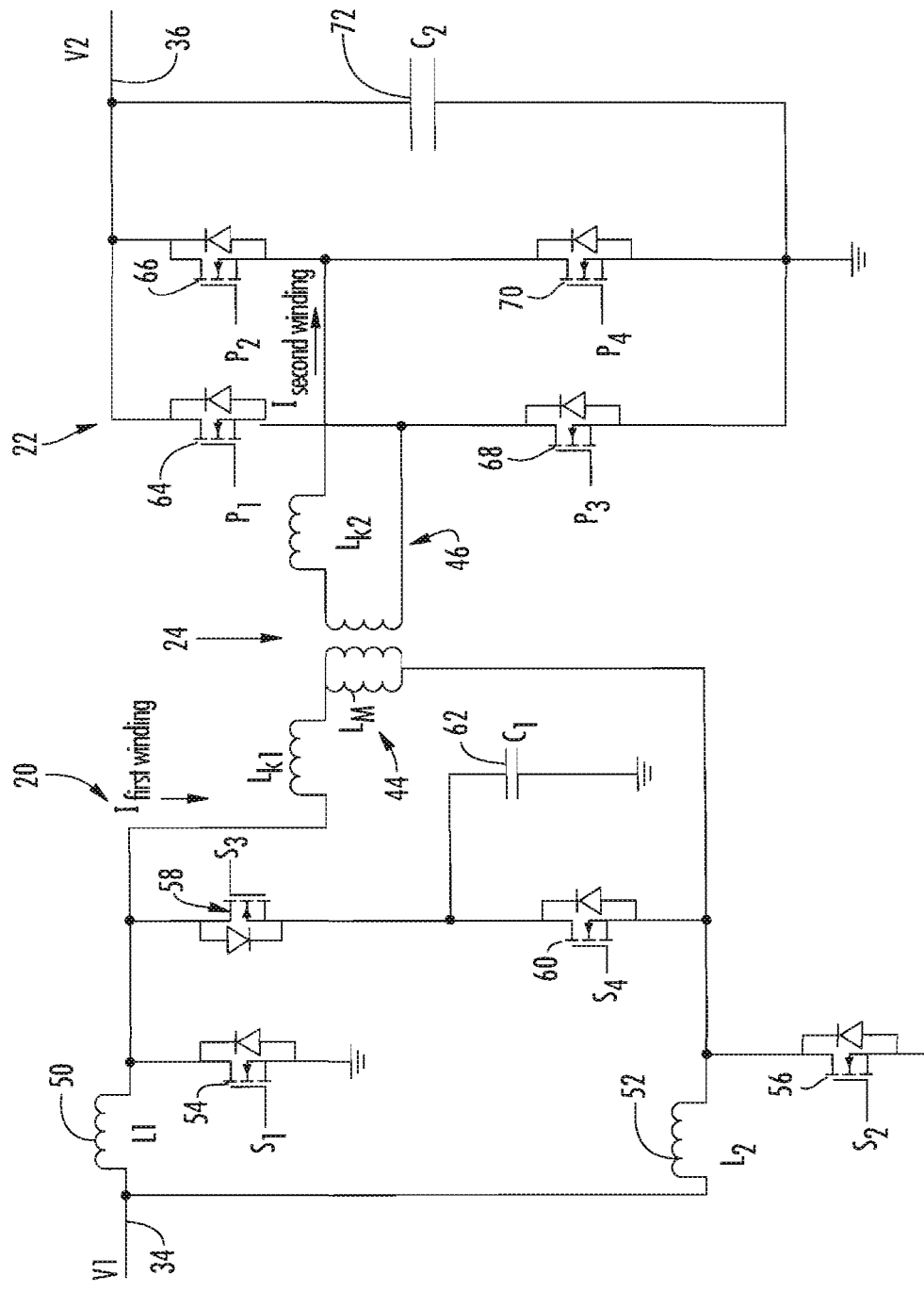
FIG. 2 is a more detailed schematic diagram of an embodiment of the converter stages and transformer of the bidirectional converter of FIG. 1.

FIG. 2 is a schematic diagram of the first and second converter stages 20 and 22 and of the transformer 24 of a two-phase embodiment of the bidirectional converter 18 of FIG. 1. As discussed below, an embodiment of the converter 18 may provide one or more advantages, including:

a) allowing the transformer 24 to have a relatively low turns ratio (e.g., 1:1) for improved transformer efficiency;

b) eliminating the need for a pre-regulator circuit on either side of the transformer 24 to reduce the component count and size of the converter 18;

c) allowing the transistors to switch under zero-voltage-switching (ZVS) or zero-current-switching (ZCS) conditions in most circumstances for improved efficiency of the converter 18, and to reduce the size of one or more components of the converter in high-frequency applications;

d) allowing the first converter stage 20 to operate as a current multiplier (e.g., a current doubler) while the converter 18 is providing a current (e.g., a charging current) to the source/load 12 (FIG. 1) so as to reduce the sizes of at least some of the components of the converter 18;

e) allowing the first converter stage 20 to operate as a multiphase boost circuit while the converter 18 is providing a current (e.g., a charging current) to the source/load 14 (FIG. 1) so as to allow elimination of at least one pre-regulator circuit from the converter 18 and to allow a relatively low turns ratio for the transformer 24;

f) allowing the controller 30 (FIG. 1) to be constructed from a commercially available power-supply controller, with perhaps minor modifications;

g) reducing the ripple-voltage components of the voltages $V_1$ and $V_2$ due to the multiphase structure of the converter 18; and h) modulizing the converter 18 to allow phase dropping for improving the light-load efficiency of the converter.

The first converter stage 20 of the bidirectional converter 18 includes phase inductors 50 and 52 having inductances $L_1$ and $L_2$, low-side switching transistors 54 and 56, which receive switching signals $S_1$ and $S_2$ from the controller 30 (FIG. 1), high-side switching transistors 58 and 60, which receive switching signals $S_3$ and $S_4$ from the controller, and a filter capacitor 62 having a capacitance $C_1$. The inductor 50 and transistors 54 and 58 form a first phase of the converter 18, and the inductor 52 and transistors 56 and 60 form a second phase of the converter. The number of phases (two phases in this embodiment) in the first converter stage 20 may be considered the number of phases in the bidirectional converter 18. For example, one may refer to the converter 18 as a two phase converter of the first converter stage 20 has two phases. As discussed below, the first converter stage 20 operates as a boost converter while power is flowing from the converter node 34 to the converter node 36, and operates as a buck converter while power is flowing from the converter node 36 to the converter node 34.

The second converter stage 22 of the bidirectional converter 18 includes high-side switching transistors 64 and 66, which receive switching signals $P_1$ and $P_2$ from the controller 30 (FIG. 1), low-side switching transistors 68 and 70, which receive switching signals $P_3$ and $P_4$ from the controller, and a filter capacitor 72 having a capacitance $C_2$. The transistors 64 and 70 form a first half-bridge of the second stage 22, and the transistors 66 and 68 form a second half-bridge of the converter. As discussed below, the second stage 22 operates as a synchronous full-wave rectifier while power is flowing from the converter node 34 to the converter node 36, and operates as a DC-AC converter (a DC-to-square-wave converter in an embodiment) while power is flowing from the converter node 36 to the converter node 34.

The transformer 24 includes a first-stage winding 44 that may be modelled as having a leakage inductance $L_{k1}$, a second-stage winding 46 that may be modelled as having a leakage inductance $L_{k2}$, and the transformer itself may be modelled as having a magnetizing (sometimes called a coupling) inductance $L_m$.

Figure 3:
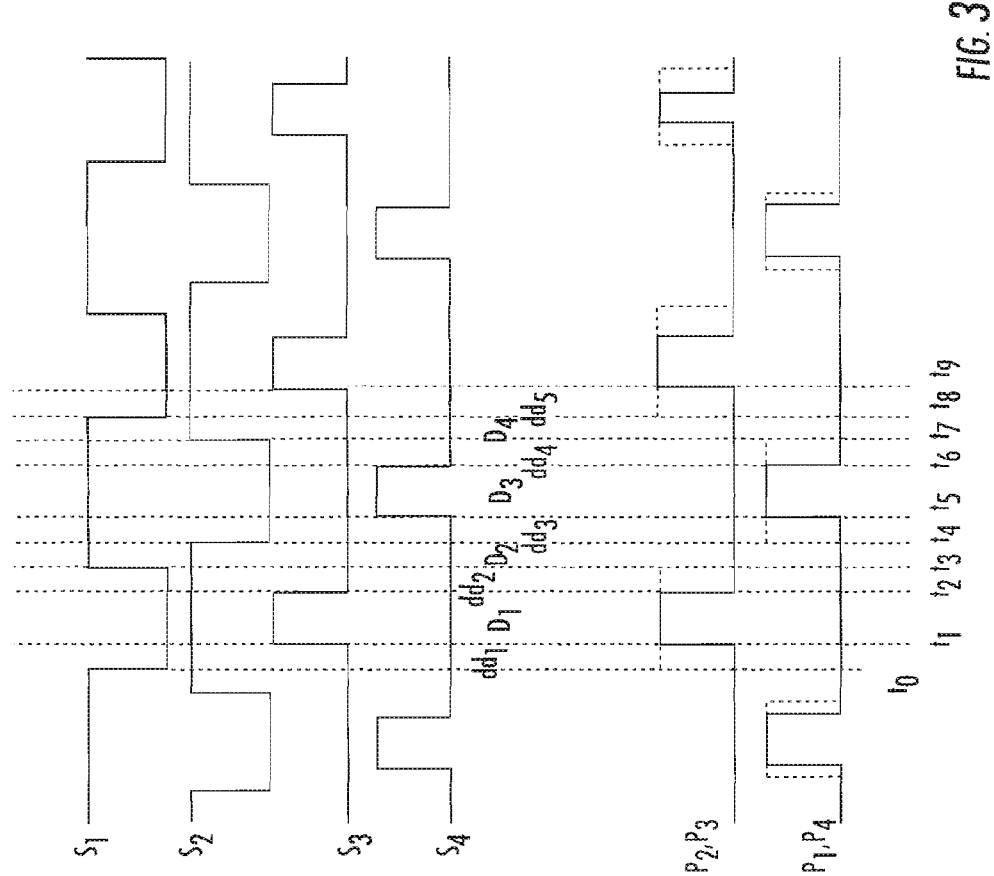
FIG. 3 is a timing diagram the switching signals for an embodiment of the converter stages of FIG. 2 operating at a duty cycle of greater than 50%.

FIG. 3 is a timing diagram of the signals $S_1$-$S_4$ and $P_1$-$P_4$ of FIG. 2 while an embodiment of the converter 18 of FIG. 2 is operating with a duty cycle greater than 50% to transfer power in one or the other direction. Although in this embodiment the "duty cycle" of the stage 20 and 22, and thus of the converter 18, is defined as the ratio of the logic-high portion of the $S_1$ switching period to the total $S_1$ switching period, other definitions of the "duty cycle" are contemplated.

Referring to FIGS. 2 and 3, first is described an operational mode of an embodiment of the converter 18 where the converter has duty cycle of greater than 50% and is transferring power from the converter node 34 to the converter node 36 (i.e., from the first converter stage 20 to the second converter stage 22). In this mode of operation, the first converter stage 20 operates as a boost converter (a two-phase boost converter in the described embodiment), and the second converter stage 22 operates as a synchronous full-wave rectifier. Furthermore, the delay periods $dd_x$ are fixed durations that are independent of the duty cycle, and may be generated by the controller 30 to allow at least some of the transistors to achieve at least approximately ZVS or ZCS as described below. In contrast, the periods $D_x$ depend on the duty cycle.

At a time $t_1$, the signal $S_1$ has an inactive-logic-low level, the signal $S_2$ has an active-logic-high level, the signal $S_3$ is transitioning from an active logic low level to an active logic high level, and the signal $S_4$ has an inactive-logic-low level; therefore, the transistor 54, operating as a switch, is off, the transistor 56 is on, the transistor 58 is transitioning from off to on, and the transistor 60 is off. Furthermore, the signals $P_2$ and $P_3$ are transitioning from active logic-low to active logic-high levels, and the signals $P_1$ and $P_4$ have inactive logic-low levels; therefore, the transistors 66 and 68 are transitioning from off to on, and the transistors 64 and 70 are off.

Because the transistor 54 has been off for at least a delay period $dd_1$ before the transistor 58 turns on, at least a portion of the boost current flowing out from the inductor 50 is flowing through the body diode of the transistor 58 (the other portion of the inductor 50 boost current, $I_{firstwinding}$, is flowing through the first-stage winding 44) to the capacitor 62, and is thus charging the capacitor.

Therefore, while the transistor 58 is turning on, it does so with approximately zero volts (e.g., a diode drop of approximately 0.6 V-0.7 V) across it; in this way, the controller 30 (FIG. 1) causes the transistor 58 to achieve, at least approximately, ZVS, thus rendering the power consumed by this transistor during its switching period relatively low. Therefore, the ZVS of the transistor 58 may improve the efficiency of the bidirectional converter 18 as compared to a conventional bidirectional converter.

Also, because the transistor 54 has been off for at least a delay time $dd_1$ before the transistors 66 and 68 turn on, one of the following two scenarios is possible: 1) the current $I_{firstwinding}$ flowing through the first-stage winding 44 induces in the second-stage winding 46 a current $I_{secondwinding}$ that is high enough to forward bias the body diodes of the transistors 66 and 68, and to thus flow through the body diode of the transistor 66, through the capacitor 72 (thus charging this capacitor), and through the body diode of the transistor 68 back to the winding 46, or 2) the current $I_{secondwinding}$ induced in the winding 46 is not high enough to forward bias the body diodes of the transistors 66 and 68.

Therefore, in the first scenario, while the transistors 66 and 68 are turning on, they do so with approximately zero Volts (e.g., a diode drop of approximately 0.6V-0.7V) across them; in this way, the controller 30 (FIG. 1) allows these transistors to achieve, at least approximately, ZVS, thus rendering the power consumed by the transistors 66 and 68 during their switching relatively low. Alternatively, in the second scenario, while the transistors 66 and 68 are turning on, they do so with approximately zero current through them; in this way, the controller 30 (FIG. 1) allows the transistors 66 and 68 to achieve, at least approximately, ZCS, thus also rendering the power consumed by the transistors 66 and 68 during their switching relatively low. Therefore, in either scenario, the respective ZVS or ZCS of the transistors 66 and 68 may further improve the efficiency of the converter 18 as compared to a conventional bidirectional converter. Furthermore, because the second scenario (ZCS) may hold even if the transistors 66 and 68 turn on at approximately the same time as the transistor 54, the controller 30 may transition the signals $P_2$ and $P_3$ to active high levels at approximately the same time that it transitions the signal $S_1$ to an inactive low level.

Next, during a period $D_1$, the signal $S_1$ is inactive low, the signal $S_2$ is active high, the signal $S_3$ is active high, and the signal $S_4$ is inactive low; therefore, the transistor 54 is off, the transistors 56 and 58 are on, and the transistor 60 is off. Furthermore, the signals $P_2$ and $P_3$ are active high, and the signals $P_1$ and $P_4$ are inactive low: therefore, the transistors 66 and 68 are on, and the transistors 64 and 70 are off.

Therefore, the boost current from the inductor 50 flows through the on transistor 58, and, therefore, this current, which was previously flowing through the body diode of the transistor 58, continues to charge the capacitor 62, and the voltage $V_{C1}$ across the capacitor (the on transistors 56 and 58 couple the capacitor $C_1$, and thus the voltage $V_{C1}$, across the winding 44) causes the current $I_{firstwinding}$ to flow through the first-stage winding 44; therefore, the magnetically induced current $I_{secondwinding}$ flows through the second-stage winding 46 and the transistors 66 and 68 to charge the capacitor $C_2$.

Furthermore, an inductor-charging current flows out from through the inductor 52 and into the transistor 56.

Moreover, because the first-stage winding 44 is connected across the capacitor 62 by the on transistors 56 and 58, the voltage across the winding 44 is effectively clamped to the voltage $V_{C1}$ across the capacitor 62. This also clamps the voltage across the second-stage winding 46 to $V_{C1}\times$ turns ratio of the transformer 24 (where the turns ratio is 1:1, then the voltage across the second winding 46 is also clamped to $V_{C1}$). Therefore, this limits the voltage across, and thus the voltage stress applied to, the transistors 66 and 68. Consequently, this may allow the bidirectional converter 18 to include smaller transistors 66 and 68 as compared to a conventional bidirectional converter.

Still during the period $D_1$, the boost current from the inductor 50 may remain relatively constant, but the current $I_{firstwinding}$ through the first-stage winding 44 is increasing due to the voltage $V_{C1}$ from the capacitor 62 being applied across the first-stage winding.

Therefore, when the current $I_{firstwinding}$ through the first-stage winding 44 exceeds the boost current from the inductor 50, a current flows from the capacitor 62, through the transistor 58, and through the first-stage winding to make up the difference between the first-stage winding current $I_{firstwinding}$ and the boost current. That is the current from the capacitor 62 equals the difference between the boost current from the inductor 50 and the current $I_{firstwinding}$. As time passes during the period $D_1$, the current sourced by the capacitor 62 to the first-stage winding 44 increases, and the boost current from the inductor 50 may stay substantially constant or decrease, although such a decrease, if it occurs, may be negligible.

At a time $t_2$, the controller 30 transitions the signal $S_3$ from an active logic-high level to an inactive logic-low level, thus turning off the transistor 58. Furthermore, the controller 30 transitions the signals $P_2$ and $P_3$ to an inactive logic-low level, thus turning off the transistors 66 and 68.

During a delay period $dd_2$, because the current $I_{firstwinding}$ through the first-stage winding 44 does not change instantaneously, the portion of $I_{firstwinding}$ supplied by the capacitor 62 before the transistor 58 was turned off (at time $t_2$) is now supplied through the body diode of the transistor 54. The duration of the period $dd_2$ may be at least long enough to allow the body diode of the transistor 54 to begin to conduct. Furthermore, the induced current $I_{secondwinding}$ through the second-stage winding 46 flows through the body diodes of the transistors 66 and 68.

Also during the delay period $dd_2$, an inductor-charging current continues to flow from the inductor 52 through the transistor 56 to ground.

At a time $t_3$, the controller 30 transitions the switching signal $S_1$ to an active logic-high level, thus turning on the transistor 54. But because the body diode of the transistor 54 is already conducting per above, this transistor achieves at least approximately ZVS, which may improve the efficiency of the converter 18. Furthermore, instead of transitioning the signals $P_2$ and $P_3$ to inactive logic-low levels at time $t_2$, the controller 30 may so transition $P_2$ and $P_3$ at time $t_3$ to reduce the time that the second-stage-winding current $I_{secondwinding}$ flows through the body diodes of the transistors 66 and 68, and to thus improve the efficiency of the bidirectional converter 18.

Next, during a period $D_2$, both the transistors 54 and 56 are on, thus effectively connecting together both end nodes of the first-stage winding 44. If the period $D_2$ is long enough, then the current $I_{firstwinding}$ through the first winding 44 caused by the discharging of the leakage inductance $L_{k1}$ will decay to zero, and thus the current $I_{secondwinding}$ through the second-stage winding 46 will also decay to zero. As discussed below, this may allow the transistors 64 and 70 to achieve at least approximately ZCS.

Then, at a time $t_4$, the controller 30 transitions the signal $S_2$ to an inactive logic-low level, and thus turns off the transistor 56. Furthermore, the controller 30 may transition the signals $P_1$ and $P_4$ to active logic-high levels to turn on the transistors 64 and 70; if, per above, the current through the second-stage winding 46 has decayed to zero, then the transistors 64 and 70 achieve at least approximately ZCS.

During a delay period $dd_3$, the boost current from the inductor 52 that was flowing through the transistor 56 before it was turned off now flows toward the first winding 44.

But because the current $I_{firstwinding}$ through the first-stage winding 44 cannot change instantaneously (from, e.g., zero as discussed above), the voltage at the node between the inductor 52 and the first-stage winding increases until the body diode of the transistor 60 begins to conduct this boost current—the delay period $dd_3$ may be at least long enough to allow the body diode of the transistor 60 to begin to conduct. This current through the body diode of the transistor 60 charges the capacitor 62.

At a time $t_5$, the controller 30 (FIG. 1) transitions the switching signal $S_4$ from an inactive logic-low level to an active logic-high level, thus turning on the transistor 60.

But because the body diode of the transistor 60 is conducting at least a portion of the boost current from the inductor 52 at the time $t_5$, this transistor achieves at least approximately ZVS, which may thus improve the efficiency of the bidirectional converter 18 as compared to a conventional bidirectional converter.

Also at time $t_5$, the controller 30 (FIG. 1) may transition the signals $P_1$ and $P_4$ to active logic-high levels to turn the transistors 64 and 70 on at the time $t_5$ instead of at the time $t_4$.

But even when turned on at the time $t_5$, the transistors 64 and 70 achieve at least approximately ZVS or ZCS, thus potentially improving the efficiency of the converter 18. If the current $-I_{secondwinding}$ through the second-stage winding 46, which current is induced by the current $-I_{firstwinding}$ through the first-stage winding 44, is not high enough at the time $t_5$ to turn on the body diodes of the transistors 64 and 70, then at least this current is low enough to allow the transistors 64 and 70 to achieve at least approximately ZCS. But if the current $-I_{secondwinding}$ through the winding 46 is high enough to turn on the body diodes of the transistors 64 and 70, then the transistors 64 and 70 achieve at least approximately ZVS. Note that $-I_{firstwinding}$ flows through the first-stage winding 44 in a direction opposite to the direction indicated by the respective arrow in FIG. 2; likewise, $-I_{secondwinding}$ flows through the second-stage winding 46 in a direction opposite to the direction indicated by the respective arrow in FIG. 2.

During a period $D_3$, the signal $S_2$ is inactive logic low, the signal $S_1$ is active logic high, the signal $S_4$ is active logic high, and the signal $S_3$ is inactive logic low; therefore, the transistor 54 is on, the transistors 56 and 58 are off, and the transistor 60 is on. Furthermore, the signals $P_2$ and $P_3$ are inactive logic low, and the signals $P_1$ and $P_4$ are active logic high: therefore, the transistors 66 and 68 are off, and the transistors 64 and 70 are on.

Therefore, the boost current from the inductor 52 flows through the on transistor 60, and, therefore, this current, which was previously flowing through the body diode of the transistor 60, continues to charge the capacitor 62, and the voltage $-V_{C1}$ causes the current $-I_{firstwinding}$ to flow through the first-stage winding 44; therefore, an induced current $-I_{secondwinding}$ flows through the winding 46 and the transistors 64 and 70 to maintain the voltage $V_2$ across the capacitor $C_2$ at a desired level.

Furthermore, during the period $D_3$, an inductor-charging current flows through the inductor 50 and the transistor 54 to ground.

Moreover, because the first-stage winding 44 is connected across the capacitor 62 by the on transistors 54 and 60, the voltage across the first-stage winding is effectively clamped to the voltage $-V_{C1}$ across the capacitor—the "$-$" sign indicates that the polarity of $V_{C1}$ relative to the first-stage winding 44 causes a current $-I_{firstwinding}$ to flow through the first-stage winding. This also clamps the voltage across the second-stage winding 46 to $-V_{C1}\times$ the turns ratio of the transformer 24 (where the turns ratio is 1:1, then the voltage across the second-stage winding is also clamped to $-V_{C1}$). Therefore, this limits the voltage across, the thus the voltage stress applied to, the transistors 64 and 70. Consequently, this may allow the bidirectional converter 18 to include smaller transistors 64 and 70 as compared to a conventional bidirectional converter.

Still during the period $D_3$, the boost current from the inductor 52 may remain relatively constant, but the current $-I_{firstcurrent}$ through the first-stage winding 44 is increasing due to the voltage $-V_{C1}$ from the capacitor 62 being applied across the first-stage winding.

Therefore, when the current $-I_{firstwinding}$ through the first winding 44 exceeds the boost current from the inductor 52, a current sourced by the capacitor 62 flows through the transistor 60 and into the first-stage winding to make up the difference between the current $-I_{firstwinding}$ and the boost current. As time passes during the period $D_3$, the portion of the current $-I_{firstwinnding}$ sourced by the capacitor 62 increases, and the boost current from the inductor 52 may stay substantially constant or decrease, although such a decrease, if it occurs, may be negligible.

At a time $t_6$, the controller 30 (FIG. 1) transitions the signal $S_4$ from an active logic-high level to an inactive logic-low level, thus turning off the transistor 60.

Also at the time $t_6$, the controller 30 transitions the signals $P_1$ and $P_4$ from an active logic-high level to an inactive logic-low level, thus turning off the transistors 64 and 70.

During a delay period $dd_4$, because the current $-I_{firstwinding}$ through the first-stage winding 44 does not change instantaneously, the portion of this current supplied by the capacitor 62 before the transistor 60 was turned off at the time $t_6$ is now supplied through the body diode of the transistor 56. The duration of the period $dd_4$ may be at least long enough to allow the body diode of the transistor 56 to begin to conduct.

Also during the delay period $dd_4$, an inductor-charging current continues to flow from the inductor 50 and through the transistor 54 to ground.

Furthermore during the delay period $dd_4$, the current $-I_{secondwinding}$ still flowing through the second-stage winding 46 continues to flow through the body diodes of the transistors 64 and 70.

At a time $t_7$, the controller 30 transitions the switching signal $S_2$ to an active logic-high level, thus turning on the transistor 56. But because the body diode of the transistor 56 is already conducting per above, the transistor 56 achieves at least approximately ZVS, which may improve the efficiency of the converter 18. Furthermore, instead of transitioning the signals $P_1$ and $P_4$ to inactive logic-low levels at the time $t_6$, the controller 30 may so transition $P_1$ and $P_4$ at the time $t_7$ to reduce the time that the second-stage winding current $-I_{secondwinding}$ flows through the body diodes of the transistors 64 and 70, and to thus improve the efficiency of the bidirectional converter 18.

Next, during a period $D_4$, both the transistors 54 and 56 are on, thus effectively connecting together the end nodes of the first-stage winding 44. If the period $D_4$ is long enough, then the current $-I_{firstwinding}$ through the first-stage winding 44 caused by the leakage inductance $L_{k1}$ will decay to zero, and thus the current $-I_{secondwinding}$ through the second winding 46 will also decay to zero. This allows at least approximately ZCS of the transistors 66 and 68 (e.g., at the time $t_8$ or $t_9$ per below) in a manner similar to that discussed above for the transistors 64 and 70.

Then, at a time $t_8$, the controller 30 transitions the signal $S_1$ to an inactive logic-low level, and thus turns off the transistor 54.

Next, during a delay period $dd_5$ the boost current from the inductor 50 that was flowing through the transistor 54 causes the body diode of the transistor 58 to conduct.

Then, the above-described cycle repeats.

Still referring to FIGS. 2 and 3, alternate embodiments of the above-described boost operation are contemplated. For example, at least one of the delay periods $dd_1$-$dd_5$ may be omitted, although this may reduce the efficiency of the bidirectional converter 18.

Figure 4:
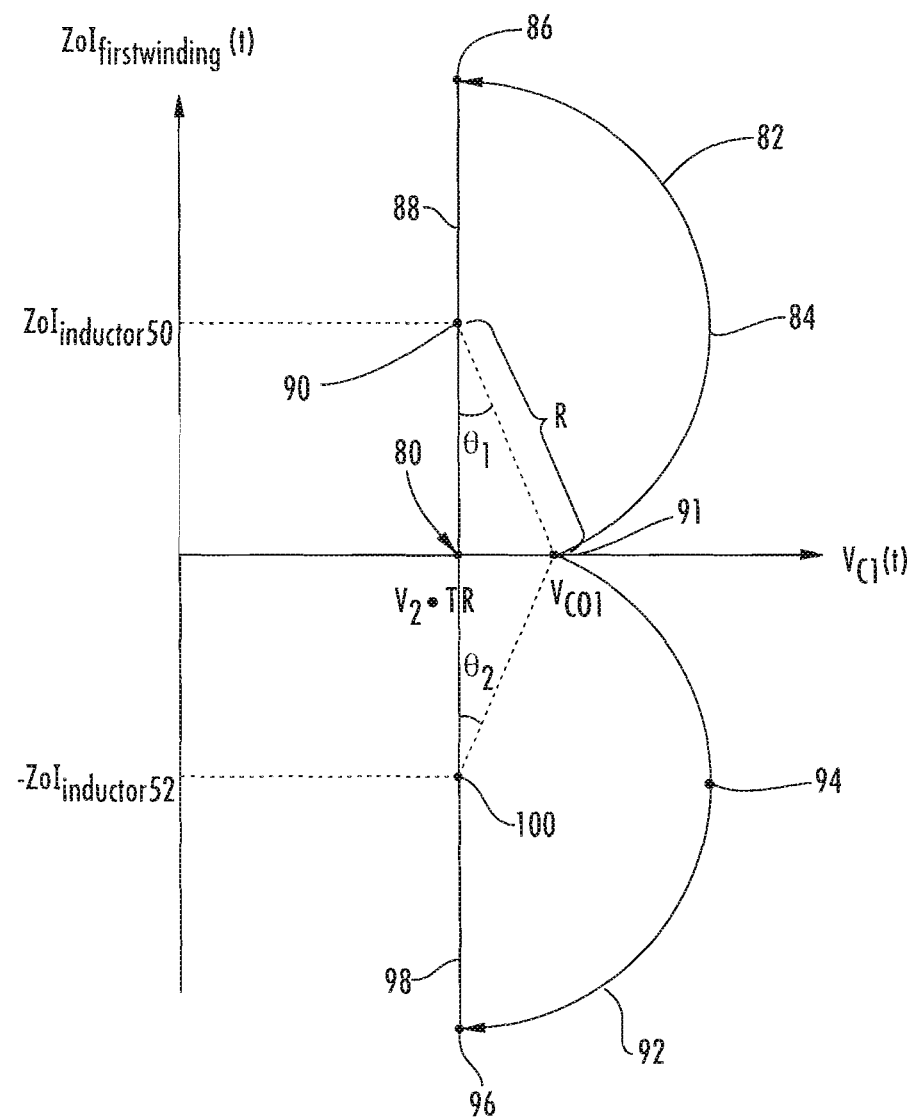
FIG. 4 is a plot of the voltage across the first-stage filter capacitor of FIG. 2 versus the current through the first transformer winding of FIG. 2 while an embodiment of the first converter stage of FIG. 2 is operating in a boost mode.

FIG. 4 is a plot of the voltage $V_{C1}$ across the capacitor 62 of FIG. 2 versus the current $I_{firstwinding}$ through the first-stage transformer winding 44 of FIG. 2 while an embodiment of the bidirectional converter 18 is operating in a boost mode. The voltage $V_{C1}$ is plotted along the x-axis, and the current $I_{firstwinding}$, scaled by a value $Z_0=1/C_1$, is plotted along the y-axis.

Referring to FIGS. 2-4, the operation of an embodiment of the bidirectional converter 18 of FIGS. 1-2 in boost mode with a duty cycle of greater than 50% is again discussed, but this time in terms of the voltage $V_{C1}$ across the capacitor 62 and the current $I_{firstwinding}$ through the first-stage transformer winding 44. As discussed below in conjunction with FIG. 6, analyzing the operation in view of $V_{C1}$ and the current $I_{firstwinding}$ illustrates how an embodiment of the bidirectional converter 18 may smoothly transition from transferring power in one direction to transferring power in the other direction.

As discussed above in conjunction with FIGS. 2 and 3, at the time $t_1$ (FIG. 3), which corresponds to point 80 of FIG. 4, the controller 30 transitions the signal $S_3$ to an active logic-high level to turn the transistor 58 on, and the current $I_{firstwinding}$ is, for example purposes, assumed to be zero due to the transistors 54 and 56 connecting together the end nodes of the first-stage winding 44 before $t_1$. Assuming that $I_{firstwinding}$ is zero is a valid assumption where the delay time $dd_1$ between the falling edge of $S_1$ and the rising edge of $S_3$ is long enough to allow the body diode of the transistor 58 to conduct so that this transistor achieves at least approximately ZVS.

During the period $D_1$ of FIG. 3, which corresponds to the curve 82 in FIG. 4, the capacitor 62 begins to charge, and, therefore, $V_{C1}$ begins to rise, due to a first portion of the boost current from the inductor 50 flowing through the transistor 58 and into the capacitor. Also, the current $I_{firstwinding}$ begins to increase, and is equal to a second portion of the boost current from the inductor 50.

Because the on transistors 56 and 58 apply the voltage $V_{C1}$ across the first-stage winding 46, the current $I_{firstwinding}$ continues to increase.

At a point 84 of the curve 82, $I_{firstwinding}$ begins to exceed the boost current through the inductor 50.

Therefore, this excess portion of $I_{firstwinding}$—this excess portion being the difference between $I_{firstwinding}$ and the boost current through the inductor 50—is sourced by the capacitor 62, thus causing $V_{C1}$ to begin to decrease (i.e., the capacitor 62 is discharging).

It is assumed that the delay $dd_2$ is short enough that it can be ignored for purposes of this analysis, such that at the time $t_3$ of FIG. 3 and at a point 86 of FIG. 4, the controller 30 (FIG. 1) transitions the signal $S_1$ to an active logic-high level and the signal $S_3$ to an inactive logic-low level to turn on the transistor 54 and to turn off the transistor 58.

Therefore, because the capacitor 62 is isolated from the first-stage winding 44, the voltage $V_{C1}$ remains at a constant value, and because both transistors 54 and 56 are on to couple together the end nodes of the first-stage winding 44, the current $I_{firstwinding}$ quickly decays to zero along a line 88 of FIG. 4, such that the state of the bidirectional converter 18 has returned to the point 80 of FIG. 4.

Assuming, for purposes of explanation, that the inductance $L_1$ of the inductor 50 is significantly (e.g., ten times or more) greater than the leakage inductance $L_{k1}$ of the first-stage winding 44, then one may model the inductance 50 as a current source during the period $D_1$.

Therefore, making this assumption, one may show that the curve 82 and the points 84 and 86 lie on a circle having a center 90 at a point $(V_2 \cdot TR, Z_0 I_{inductor50})$ and a radius $R_1$ given by the following equation:

$$R_1 = \sqrt{(V_{co1}-V_2 \cdot TR)^2 + (Z_0 I_{inductor50})^2} \tag{1}$$

where $V_{C01}$ is the value of $V_{C1}$ at point 91 of FIG. 4 when $I_{firstwinding}=0$, and TR is the turns ratio of the transformer 24 (FIG. 2) looking at the first-stage side from the second-stage side.

And an angle $\theta_1$ between the line 88 and a radius R to the point 91 is given by the following equation:

$$\theta_1 = \arctan \frac{V_{C01} - V_2 \cdot TR}{Z_0 I_{inductor50}} \tag{2}$$

In an embodiment, the point 91 is not coincident with the point 80 because the voltage across the first-stage winding 44 must exceed $V_2 \cdot TR$ before a nonzero current $I_{firstwinding}$ begins to flow. This is because the on transistors 66 and 68 effectively clamp the right side of $L_{k1}$ (FIG. 2) to $V_2 \cdot TR$, so in order to cause a current to flow through the first-stage winding 44, the voltage on the left side of $L_{k1}$ must be greater than $V_2 \cdot TR$, even if only by a small amount (the amount shown in FIG. 4 may be exaggerated for clarity). Therefore, for example, where the transistor 58 turns on at the beginning of the delay period $dd_1$ such that it does not achieve ZVS, then the voltage $V_{C1}$ across the capacitor may increase to $V_{C01} + V_2 \cdot TR$ before a nonzero current $I_{firstwinding}$ begins to flow through the first-stage winding 44.

In another embodiment, the point 91 is substantially coincident with the point 80. If the transistor 58 turns on at the time $t_1$, and thus achieves ZVS, the diode drop across the body diode of the transistor 58 may increase the voltage at the left side of $L_{k1}$ enough so that a nonzero current $I_{firstwinding}$ begins to flow at substantially the same time as the capacitor 62 begins to charge (i.e., at substantially the same time as the voltage $V_{C1}$ begins to increase). Therefore, in such an embodiment equations (1) and (2) reduce to the following equations.

$$R_1 = \sqrt{(V_{co1} - V_2 \cdot TR = 0)^2 + (Z_0 I_{inductor50})^2} = Z_0 I_{inductor50} \tag{3}$$

$$\theta_1 = \arctan \frac{V_{C01} - V_2 \cdot TR = 0}{Z_0 I_{inductor50}} \tag{4}$$

In yet another embodiment where a nonzero current $I_{firstwinding}$ begins to flow before the capacitor 62 begins to charge, the point 91 may be above, if only slightly, the point 80 on the line 88, in which case the angle $\theta_1$ remains equal to zero, and the radius $R_1$ is reduced from its value in equation (3) by the magnitude of $I_{firstwinding}$ when the capacitor 62 begins to charge (i.e., when $V_{C1}$ begins to increase). This situation may occur if the transistor 58 turns on at the time $t_1$, and the voltage across the body diode of this transistor causes a nonzero current $I_{firstwinding}$ to flow before the body diode begins to conduct.

Still referring to FIG. 4, continuing on, during the period $D_2$, the current $I_{firstwinding}$ through the first-stage winding 44 remains at zero, and, therefore, the operating condition of the bidirectional converter 18, particularly of the first converter stage 20, remains at the point 80 of FIG. 4.

Next, for purposes of this analysis, it is assumed that the delay $dd_3$ is short enough to be ignored, such that at the time $t_5$ the controller 30 (FIG. 1) transitions the signal $S_2$ to an inactive logic-low level and the signal $S_4$ to an active logic-high level, thus turning off the transistor 56 and turning on the transistor 60.

During the period $D_3$, which corresponds to the curve 92 in FIG. 4, the capacitor 62 begins to charge, and, therefore, $V_{C1}$ begins to rise from the point 91, due to a first portion of the boost current from the inductor 52 flowing through the transistor 60 and into the capacitor, and the current $-I_{firstwinding}$ begins to increase, and is equal to a second portion of the boost current from the inductor 52. As explained above in conjunction with FIGS. 2-3, the current $-I_{firstwinding}$ is negative because it is flowing through the winding 44 in a direction opposite to its direction during the period $D_1$; this is why the curve 92 is in the lower-right quadrant of the plot of FIG. 4. Furthermore, for purposes of this analysis, it is assumed that the inductance $L_2$ of the inductor 52 equals the inductance $L_1$ of the inductor 50.

Because the voltage $-V_{C1}$ is across the first-stage winding 44, the magnitude of the current $-I_{firstwinding}$ continues to increase.

At a point 94 of the curve 92, the magnitude of $-I_{firstwinding}$ begins to exceed the boost current from the inductor 52.

Therefore, this excess portion of $-I_{firstwinding}$, which is equal to the difference between the magnitudes of $-I_{firstwinding}$ and the boost current through the inductor 52, is sourced by the capacitor 62, thus causing the magnitude of $-V_{C1}$ to begin to decrease.

For purposes of this analysis, it is assumed that the delay $dd_4$ is short enough that it can be ignored, such that at the time $t_7$ of FIG. 3 and at a point 96 of FIG. 4, the controller 30 (FIG. 1) transitions the signal $S_2$ to an active logic-high level and the signal $S_4$ to an inactive logic-low level to turn on the transistor 56 and to turn off the transistor 60.

Therefore, because the capacitor 62 is isolated from the first-stage winding 44, the voltage $-V_{C1}$ remains at a constant value, and because both transistors 54 and 56 are on, the current $-I_{firstwinding}$ quickly decays to zero along a line 98 of FIG. 4, such that the state of the bidirectional converter 18 has returned to the stable point 80 of FIG. 4 where the current $-I_{firstwinding}$ is zero and the voltage $-V_{C1}$ is unchanging.

In an embodiment where the inductance $L_2$ of the inductor 52 is significantly (e.g., ten times or more) greater than the leakage inductance $L_{k1}$ of the first-stage winding 44, then one may model the inductor 52 as a current source during the period $D_3$.

Therefore, making this assumption, one may show that the curve 92 and the points 94 and 96 lie on a circle having a center 100 at a point $(V_2 \cdot TR, -Z_0 I_{inductor52})$ and a radius $R_1$ given by the following equation:

$$R_1 = \sqrt{(V_{C01} - V_2 \cdot TR)^2 + (Z_0 I_{inductor52})^2} \tag{5}$$

where $V_{C0}$ is the value of $V_{C1}$ at the point 91 of FIG. 4 when $-I_{firstwinding}=0$.

And an angle $\theta_2$ between the line 98 and a radius R to the point 91 of FIG. 4 is given by the following equation:

$$\theta_2 = \arctan \frac{V_{C01} - V_2 \cdot TR}{Z_0 I_{inductor52}} \tag{6}$$

As discussed above, in an embodiment, the point 91 is not coincident with the point 80 because the voltage across the first-stage winding 44 must exceed zero before a nonzero current $-I_{firstwinding}$ begins to flow. This is because the on transistors 64 and 70 effectively clamp the right side of $L_{k1}$ (FIG. 2) to $-V_2 \cdot TR$, so in order to cause a current to flow through the first-stage winding 44, the magnitude of the voltage on the bottom side of the first-stage winding must be greater than $V_2 \cdot TR$, even if only by a small amount (the amount shown in FIG. 4 may be exaggerated for clarity). Therefore, for example, where the transistor 60 turns on at the beginning of the delay period $dd_3$ such that it does not achieve ZVS, then the voltage $V_{C1}$ across the capacitor may increase to $V_{C0}+V_2 \cdot TR$ before a nonzero current $-I_{firstwinding}$ begins to flow through the first-stage winding 44.

In another embodiment, the point 91 is substantially coincident with the point 80. If the transistor 60 turns on at the time $t_5$, and thus achieves ZVS, the diode drop across the body diode of the transistor 60 may increase the voltage at the bottom side of the first-stage winding 44 enough so that a nonzero current $-I_{firstwinding}$ begins to flow at substantially the same time as the capacitor 62 begins to charge (i.e., at substantially the same time as the voltage $V_{C1}$ begins to increase). Therefore, in such an embodiment equations (1) and (2) reduce to the following equations.

$$R_1 = \sqrt{(V_{c01} - V_2 \cdot TR = 0)^2 + (Z_0 I_{inductor52})^2} = Z_0 I_{inductor52} \tag{7}$$

$$\theta_1 = \arctan \frac{V_{C01} - V_2 \cdot TR = 0}{Z_0 I_{inductor52}} = 0 \tag{8}$$

In yet another embodiment where a nonzero current $-I_{firstwinding}$ begins to flow before the capacitor 62 begins to charge, the point 91 may be below, if only slightly, the point 80 on the line 98, in which case the angle $\theta_2$ remains equal to zero, the radius $R_1$ is reduced from its value in equation (7) by the magnitude of $-I_{firstwinding}$ when the capacitor 62 begins to charge (i.e., when $V_{C1}$ begins to increase), and the point 91 for this mode is different than the point 91 for the above described mode (i.e., there are effectively two points 91). This situation may occur if the transistor 62 turns on at the time $t_5$, and the voltage across the body diode of this transistor causes a nonzero current $-I_{firstwinding}$ to flow before the body diode begins to conduct.

Still referring to FIG. 4, one may see that where the duty cycle of the bidirectional converter 18 (FIG. 2) in boost mode is greater than 50%, the plot of the current $I_{firstwinding}$ and the capacitor voltage $V_{C1}$ follows a "distorted" figure eight, starting from point 80, to the point 91, along the curve 82 to the point 86, from the point 86 along the line 88 back to the point 80, from the point 80 to the point 91 and along the curve 92 to the point 96, and from the point 96 along the line 98 back to the point 80. A similar smooth transition may be shown for the other scenarios (i.e., where the point 91 coincides with the point 80, or where the point 91 has a nonzero coordinate along the y-axis). Therefore, the current $I_{firstwinding}$ smoothly transitions from one direction to another through the zero-current point 80; consequently, the current $I_{secondwinding}$ through the second-stage winding 46 likewise smoothly transitions through its zero point. And, as discussed below in conjunction with FIG. 6, such a smooth transition of $I_{firstwinding}$ and $I_{secondwinding}$ may also occur when the direction of power transfer changes.

Referring again to FIGS. 2 and 3, now is described a buck operational mode of an embodiment of the converter 18, where the converter has a steady-state duty cycle of greater than 50% (i.e., $S_1$ and $S_2$ are logic high for more than 50% of the switching period), and is transferring power from the converter node 36 to the converter node 34 (i.e., from the second stage 22 to the first stage 20). In this mode of operation, the first converter stage 20 operates as a buck converter that provides power to (e.g., charges) the source/load 12 (FIG. 1), and the second converter stage 22 operates as a synchronous DC-AC converter. As discussed below, despite the change in the direction of power transfer, the switching timing, for example, the duty cycle, of the converters stages 20 and 22 may be at least approximately the same as described above during power transfer from the node 34 to the node 36 for a duty cycle>50%.

At the time $t_1$, the signal $S_1$ is inactive low, the signal $S_2$ is active high, the signal $S_3$ is transitioning from active low to active high, and signal $S_4$ is inactive low; therefore, the transistor 54 is off, the transistor 56 is on, the transistor 58 is transitioning from off to on, and the transistor 60 is off. Furthermore, the signals $P_2$ and $P_3$ are transitioning from active low to active high, and the signals $P_1$ and $P_4$ are inactive low; therefore, the transistors 66 and 68 are transitioning from off to on, and the transistors 64 and 70 are off.

Because the transistors 54 and 56 were both simultaneously on prior to a time $t_0$, the current $I_{firstwinding}$ through the first-stage winding 44 is assumed to be zero, for purposes of this explanation. Likewise, the current $I_{secondwinding}$ through the second-stage winding 46 is also assumed to be zero.

Because the transistors 66 and 68 turn on at time $t_1$ when the current $I_{secondwinding}$ is zero, these transistors 66 and 68 achieve at least approximately ZCS, which may improve the efficiency of the bidirectional converter 18 as compared to a conventional bidirectional converter.

As the transistors 66 and 68 turn on, the current $-I_{secondwinding}$ begins to flow from the capacitor 72, through the transistor 66, through the second winding 46, and through transistor 68 back to the capacitor 72.

Because the transistor 58 also turns on at the time $t_1$ when $-I_{firstwinding}$ is zero, the transistor 58 at least approximately achieves ZCS, which may improve the efficiency of the bidirectional converter 18.

Alternatively, the transistors 66 and 68 may turn on at the time $t_0$ per the dashed lines of FIG. 3 such that a current $-I_{firswinding}$ may begin to flow before the transistor 58 turns on. Assuming that the delay period $dd_1$ is long enough to allow the body diode of the transistor 58 to begin conducting, then the transistor 58 may instead achieve at least approximately ZVS, which may improve the efficiency of the converter 18.

During the period $D_1$, the signal $S_1$ is inactive low, the signal $S_2$ is active high, the signal $S_3$ is active high, and the signal $S_4$ is inactive low; therefore, the transistor 54 is off, the transistors 56 and 58 are on, and the transistor 60 is off. Furthermore, the signals $P_2$ and $P_3$ are active high, and the signals $P_1$ and $P_4$ are inactive low: therefore, the transistors 66 and 68 are on, and the transistors 64 and 70 are off.

Because the second-stage winding 46 is connected across the capacitor 72 by the on transistors 66 and 68, the voltage across the second-stage winding is effectively clamped to the voltage $V_2$ across the capacitor. This also clamps the voltage across the first-stage winding 44 to $V_2$ times the turns ratio TR of the transformer 24 as viewed from the second-stage side (where the turns ratio is 1:1, then the voltage across the first-stage winding 44 is also clamped to $V_2$). Therefore, this limits the voltage across, the thus the voltage stress applied to, the transistors 56 and 58. Consequently, this may allow the bidirectional converter 18 to include smaller transistors 56 and 58 as compared to a conventional bidirectional converter.

Initially during the period $D_1$, a buck current that is greater than $-I_{firstwinding}$ flows through the inductor 50 into the converter mode 34. Therefore, a current from the capacitor 62 flows through the transistor 58 and through the inductor 50 to make up the difference between $-I_{firstwinding}$ and the buck current, thus discharging the capacitor and causing $V_{C1}$ to decrease.

Furthermore, a discharging current flows through the inductor 52 and the transistor 56 into the converter node 34.

Still during the period $D_1$, the current $-I_{firstwinding}$ from the first-stage winding 44 is increasing due to the on transistors 66 and 68 applying the voltage $V_2$ from the capacitor 72 across the second-stage winding 46.

At some point during the period $D_1$, the current $-I_{firstwinding}$ exceeds the buck current flowing through the inductor 50. Therefore, a first, excess portion of the current $-I_{firstwinding}$ from the first stage winding 44 charges the capacitor 62, thus causing $V_{C1}$ to increase, and a second portion of the current $-I_{firstwinding}$ flows through the inductor 50 as the buck current. By controlling the duty cycle of the bidirectional converter 18, the controller 30 (FIG. 1) causes the buck current through the inductor 50 to have a value that regulates the voltage $V_2$. That is, the controller 30 "bleeds" enough charge off of the capacitor 72 to maintain $V_2$ at a desired level.

At a time $t_2$, the signals $S_3$, $P_2$, and $P_3$ transition from active high to inactive low levels, thus turning off the transistors 58, 66, and 68. Alternatively, the controller 30 (FIG. 1) may turn off the transistors 66 and 68 slightly after (e.g., at time $t_3$) turning off the transistor 58. In this case (and even in the previous case), the portion of $-I_{firstwinding}$ that was flowing through the on transistor 58 may continue to flow through the body diode of the off transistor 58 during the delay between the turn off of the transistors 66 and 68 and the transistor 58.

During the delay period $dd_2$, because the buck current through the inductor 50 does not change instantaneously, at least the portion of the buck current previously provided by the capacitor 62 is now supplied through the body diode of the transistor 54. The duration of the period $dd_2$ may be at least long enough to allow the body diode of the transistor 54 to begin to conduct.

Also during the delay period $dd_2$, an inductor-discharging current continues to flow from ground, through the transistor 56 and the inductor 52.

At the time $t_3$, the controller 30 transitions the switching signal $S_1$ to active high, thus turning on the transistor 54. But because the body diode of the transistor 54 is already conducting per above, the transistor 54 achieves at least approximately ZVS, which may improve the efficiency of the converter 18.

Next, during the period $D_2$, both the transistors 54 and 56 are on, thus effectively coupling together the end nodes of the first-stage winding 44. If the period $D_2$ is long enough, then the current $-I_{firstwinding}$ through the first-stage winding 44 caused by the leakage inductance $L_{k1}$ will decay to zero, and thus the current through the second-stage winding 46 will also decay to zero. As discussed below, this allows the transistors 64 and 70 to achieve at least approximately ZCS.

Then, at the time $t_4$, the controller 30 transitions the signal $S_2$ to an inactive low level, and thus turns off the transistor 56.

During the delay period $dd_3$, the buck current that was flowing through the transistor 56 before it was turned off now flows through the body diode of the transistor 56.

At either time $t_4$ or $t_5$, the controller 30 transitions signals $P_1$ and $P_4$ to turn on the transistors 64 and 70. Because these transistors have no current flowing through them, they achieve at least approximately ZCS, which may improve the efficiency of the converter 18.

At time $t_5$, the controller 30 transitions $S_4$ active high, and thus turns on the transistor 60. If the controller 30 transitioned $P_1$ and $P_4$ active high at time $t_4$ then the current $I_{firstwinding}$ (induced by the current $I_{secondwinding}$ flowing through the second-stage winding 46) begins to flow through the body diode of the transistor 60 by time the $t_5$ such that this transistor achieves at least approximately ZVS. Alternatively, if the controller 30 transitions $P_1$ and $P_4$ active high at the time $t_5$, then the transistor 60 achieves at least approximately ZCS. In either scenario, the efficiency of the converter 18 may be improved.

During the period $D_3$, the signal $S_2$ is inactive low, the signal $S_1$ is active high, the signal $S_4$ is active high, and the signal $S_3$ is inactive low; therefore, the transistor 54 is on, the transistors 56 and 58 are off, and the transistor 60 is on. Furthermore, the signals $P_2$ and $P_3$ are inactive low, and the signals $P_1$ and $P_4$ are active high: therefore, the transistors 66 and 68 are off, and the transistors 64 and 70 are on.

Therefore, initially during the period $D_3$, the buck current through the inductor 52 is larger than the current $I_{firstwinding}$, and thus the buck current discharges the capacitor 62 via the on transistor 60.

Furthermore during the period $D_3$, an inductor-discharging current flows from ground, through the transistor 54, and through the inductor 50.

Moreover, because the second-stage winding 46 is connected across the capacitor 72 by the on transistors 64 and 70, the voltage across the second-stage winding is effectively clamped to the voltage $V_2$ across this capacitor. This also clamps the voltage across the first-stage winding 44 to $V_2 \times TR$ of the transformer 24 (of the turns ratio is 1:1, then the voltage across the first-stage winding 44 is also clamped to $V_2$). Therefore, this limits the voltage across, the thus the voltage stress applied to, the transistors 56 and 58. Consequently, this may allow the bidirectional converter 18 to include smaller transistors 56 and 58 as compared to a conventional bidirectional converter.

Still during the period $D_3$, the current through the first-stage winding 44 is increasing due to the voltage $V_2$ from the capacitor 72 being applied across the second-stage winding 46.

Therefore, when the current $I_{firstwinding}$ through the first-stage winding 44 exceeds the buck current through the inductor 52, a current equal to the difference between $I_{firstwinding}$ and the buck current through the inductor 50 flows through the transistor 60 and into the capacitor 62, thus charging the capacitor and increasing $V_{C1}$. As time passes during the period $D_3$, the portion $I_{firstwinding}$ to the capacitor 62 increases.

At the time $t_6$, the controller 30 (FIG. 1) transitions the signal $S_4$ from active high to inactive low, thus turning off the transistor 60.

Also at time $t_6$, the controller 30 transitions the signals $P_1$ and $P_4$ from active high to inactive low, thus turning off the transistors 64 and 70. Alternatively, the controller 30 may not turn off the transistors 64 and 70 until time $t_7$.

If the current $I_{firstwinding}$ continues to flow during the delay period $dd_4$ after the transistor 60 turns off (e.g. due to the discharge of the leakage inductance $L_{K1}$ or the transistors 64 and 70 still being on), then a portion of $I_{firstwinding}$ that exceeds the buck current through the inductor 52 flows through the body diode of the transistor 60 and into the capacitor 62.

Likewise, if the current $I_{secondwinding}$ continues to flow after the transistors 64 and 70 turn off (e.g., due to the discharge of the leakage inductance $L_{K2}$), then $I_{secondwinding}$ flows through the body diodes of the transistors 66 and 68.

Furthermore during the delay period $dd_4$, because the buck current through the inductor 52 does not change instantaneously, this current begins to flow through the body diode of the transistor 56. The duration of the period $dd_4$ may be at least long enough to allow the body diode of the transistor 56 to begin to conduct.

Also during the delay period $dd_4$, an inductor-discharging current continues to flow from ground, through the transistor 54, and through the inductor 50.

At the time $t_7$, the controller 30 transitions the switching signal $S_2$ to active high, thus turning on the transistor 56. But because the body diode of the transistor 56 is already conducting per above, the transistor 56 achieves at least approximately ZVS, which may improve the efficiency of the converter 18.

Next, during the period $D_4$, both the transistors 54 and 56 are on, thus effectively coupling together the end nodes of the first-stage winding 44. If the period $D_4$ is long enough, then the current through the first-stage winding 44 caused by the leakage inductance $L_{k1}$ will decay to zero, and thus the current through the second-stage winding 46 will also decay to zero. This allows the transistors 66 and 68 to achieve at least approximately ZCS (e.g., at time $t_8$ or $t_9$), which may improve the efficiency of the converter 18.

Then, at the time $t_8$, the controller 30 transitions the signal $S_1$ to an inactive low level, and thus turns off the transistor 54.

At either the time $t_8$ or $t_9$, the controller 30 transitions the signal $P_2$ and $P_3$ active high to turn on the transistors 66 and 68, which achieve at least approximately ZCS per above.

At the time $t_9$, the controller 30 transitions the signal $S_3$ active high to turn on the transistor 58, which achieves at least approximately ZVS (e.g., if the transistors 66 and 68 turn on at the time $t_8$) or ZCS (e.g., if the transistors 66 and 68 turn on at the time $t_9$), which may improve the efficiency of the converter 18.

Next, the above-described cycle repeats.

Still referring to FIGS. 2 and 3, alternate embodiments of the above-described buck-operating mode are contemplated. For example, at least one of the delay periods $dd_1$-$dd_5$ may be omitted, although this may reduce the efficiency of the converter 18.

Figure 5:
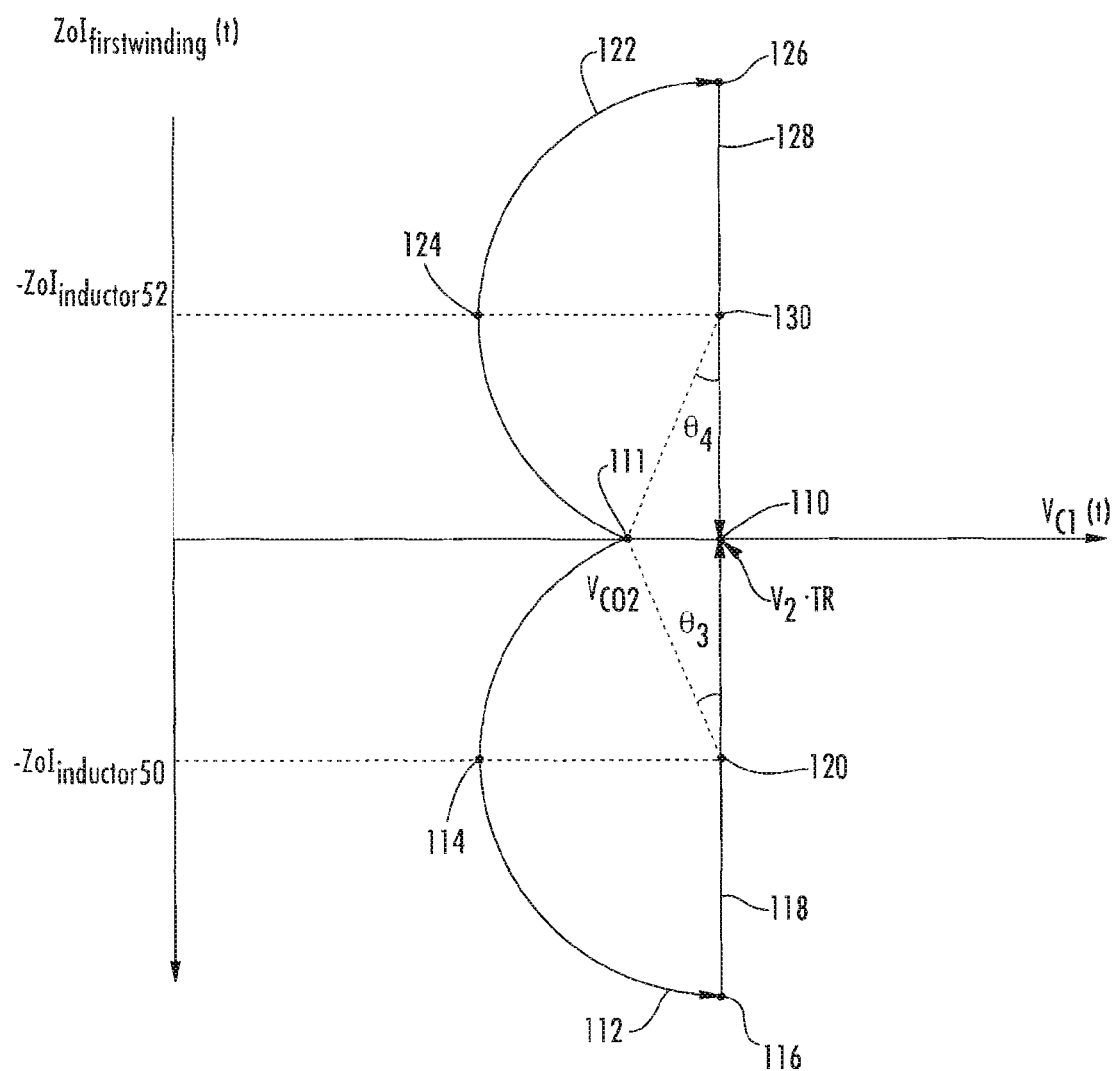
FIG. 5 is a plot of the voltage across the first-stage filter capacitor of FIG. 2 versus the current through the first transformer winding of FIG. 2 while an embodiment of the first converter stage of FIG. 2 is operating in a buck mode.

FIG. 5 is a plot of the voltage $V_{C1}$ across the capacitor 62 of FIG. 2 versus the current $I_{firstwinding}$ through the first-stage transformer winding 44 of FIG. 2 while an embodiment of the bidirectional converter 18 is operating in a buck mode. The voltage $V_{C1}$ is plotted along the x-axis, and the current $I_{firstwinding}$, scaled by a value $Z_0 = 1/C_1$, is plotted along the y-axis.

Referring to FIGS. 2-3 and 5, the operation of an embodiment of the bidirectional converter 18 of FIGS. 1-2 in buck mode with a duty cycle of greater than 50% is again discussed, but this time in terms of the voltage $V_{C1}$ across the capacitor 62 and the current $I_{firstwinding}$ through the first-stage transformer winding 44. As discussed below in conjunction with FIG. 6, analyzing the operation in view of $V_{C1}$ and the current $I_{firstwinding}$ illustrates how an embodiment of the bidirectional converter 18 may smoothly transition from transferring power in one direction to transferring power in the other direction.

As discussed above in conjunction with FIGS. 2 and 3, at the time $t_1$ (FIG. 2) or at a time $t_0$, which is the delay time $dd_1$ before the time $t_1$, and which corresponds to point 110 of FIG. 5, the controller 30 transitions the signal $S_3$ to an active logic-high level to turn the transistor 58 on, and the current $I_{firstwinding}$ is, for example purposes, assumed to be zero due to the transistors 54 and 56 effectively coupling together the end nodes of the first-stage winding 44 before the time $t_0$.

During the period $D_1$ of FIG. 3, which corresponds to the curve 112 in FIG. 5, the capacitor 62 begins to discharge, and, therefore, $V_{C1}$ begins to fall, due to a first portion of the buck current to the inductor 50 flowing from the capacitor through the transistor 58.

At a point 111, the current $-I_{firstwinding}$ begins to increase in magnitude and is equal to a second portion of the buck current to the inductor 50. In an embodiment, the point 111 does not coincide with the point 110 because the voltage $V_{C1}$ drops by an amount $V_{CO2}$ (the magnitude of $V_{CO2}$ may be exaggerated in FIG. 5 for purposes of illustration) before a non-zero current $-I_{firstwinding}$ begins to flow. As discussed above in conjunction with FIG. 4, this is because a non-zero voltage drop across the leakage inductance $L_{k1}$ may be needed for a non-zero current $-I_{firstwinding}$ to flow.

At a point 114 of the curve 112, the magnitude of $-I_{firstwinding}$ begins to exceed the buck current through the inductor 50.

Therefore, the excess portion of $-I_{firstwinding}$, this excess portion being the difference between the magnitude of $-I_{firstwinding}$ and the buck current through the inductor 50, flows through the transistor 58 to the capacitor 62, thus causing $V_{C1}$ to begin to increase (i.e., the capacitor 62 is charging).

It is assumed that the delay $dd_2$ is short enough that it can be ignored for purposes of this analysis, such that at the time $t_3$ of FIG. 3 and at a point 116 of FIG. 5, the controller 30 (FIG. 1) transitions the signal $S_1$ to an active logic-high level and at signal $S_3$ to an inactive logic-low level to turn on the transistor 54 and to turn off the transistor 58.

Therefore, because the capacitor 62 is isolated from the inductor 50, the voltage $V_{C1}$ remains at a constant value, and because both transistors 54 and 56 are on to couple together the end nodes of the first-stage winding 44, the current $-I_{firstwinding}$ quickly decays to zero along a line 118 of FIG. 5, such that the state of the bidirectional converter 18 has returned to the point 110 of FIG. 5.

Assuming, for purposes of explanation, that the inductance $L_1$ of the inductor 50 is significantly (e.g., ten times or more) greater than the leakage inductance $L_{k1}$ of the first-stage winding 44, then one may model the inductance 50 as a current source (sourcing current to the converter node 34) during the period $D_1$.

Therefore, making this assumption, one may show that the curve 112 and the points 111, 114, and 116 lie on a circle having a center 120 at $(V_2 \cdot TR, -Z_0 I_{inductor50})$ and a radius $R_2$ given by the following equation:

$$R_2 = \sqrt{(V_{co2} - V_2 \cdot TR)^2 + (Z_0 I_{inductor50})^2} \quad (9)$$

where $V_{CO2}$ is the value of $V_{C1}$ at the point 111 of FIG. 5 when $-I_{firstwinding} = 0$ as discussed above.

And an angle $\theta_3$ between the line 118 and a radius $R_2$ to the point 111 is given by the following equation:

$$\theta_3 = \arctan \frac{V_2 \cdot TR - V_{C02}}{Z_0 I_{inductor50}} \quad (10)$$

In another embodiment, the point 111 may be substantially coincident with the point 110. For example if the transistor 58 turns on at the time $t_1$ as described above, and thus achieves ZCS, the diode drop across the body diode of the transistor 54 may increase the voltage drop across $L_{k1}$ enough so that a nonzero current $-I_{firstwinding}$ begins to flow at substantially the same time as the capacitor 62 begins to discharge (i.e., at substantially the same time as the voltage $V_{C1}$ begins to decrease). Therefore, in such an embodiment equations (9) and (10) reduce to the following equations.

$$R_2 = \sqrt{(V_{co2} - V_2 \cdot TR = 0)^2 + (Z_0 I_{inductor50})^2} = Z_0 I_{inductor50} \quad (11)$$

$$\theta_3 = \arctan \frac{V_{C02} - V_2 \cdot TR = 0}{Z_0 I_{inductor50}} = 0 \quad (12)$$

In yet another embodiment where a nonzero current $-I_{firstwinding}$ begins to flow before the capacitor 62 begins to discharge, the point 111 may be below, if only slightly, the point 110 on the line 118, in which case the angle $\theta_3$ remains equal to zero and the radius R is reduced from its value in equation (11) by the magnitude of $-I_{firstwinding}$ when the capacitor 62 begins to discharge (i.e., when $V_{C1}$ begins to decrease). This situation may also occur if the transistor 58 turns on at the time $t_1$, and the voltage across the body diode of the transistor 54 causes a nonzero current $-I_{firstwinding}$ to flow before the transistor 58 begins to conduct.

Still referring to FIGS. 1-2 and 5 and continuing on, during the period $D_2$, the current $-I_{firstwinding}$ through the first-stage winding 44 remains at zero, and, therefore, the operating condition of the bidirectional converter 18 remains at the point 110 of FIG. 5.

Next, for purposes of this analysis, it is assumed, that the delay $dd_3$ is short enough to be ignored, such that at the time $t_5$ the controller 30 (FIG. 1) transitions the signal $S_2$ to an inactive logic-low level and the signal $S_4$ to an active logic-high level, thus turning off the transistor 56 and turning on the transistor 60. Alternatively, the controller 30 may transition the signal $S_2$ to an inactive logic-low level and the signal S4 to an inactive logic-high level at the time $t_4$.

During the period $D_3$, which corresponds to the curve 122 in FIG. 5, the capacitor 62 begins to discharge, and, therefore, $V_{C1}$ begins to fall from the point 111, due to a first portion of the buck current to the inductor 52 flowing from the capacitor through the transistor 60, and the current $I_{firstwinding}$ begins to increase, and is equal to a second portion of the buck current to the inductor 52. Furthermore, for purposes of this analysis, it is assumed that the inductance $L_2$ of the inductor 52 equals the inductance $L_1$ of the inductor 50.

Because the voltage $V_2$ is across the second-stage winding 46, the current $I_{firstwinding}$ continues to increase.

At a point 124 of the curve 122, $I_{firstwinding}$ begins to exceed the buck current through the inductor 52.

Therefore, this excess portion of $I_{firstwinding}$, which is equal to the difference between $I_{firstwinding}$ and the buck current through the inductor 52, is supplied to the capacitor 62, thus causing $V_{C1}$ to begin to increase.

For purposes of this analysis, it is assumed that the delay $dd_4$ is short enough that it can be ignored, such that at the time $t_7$ of FIG. 3 and at a point 126 of FIG. 5, the controller 30 (FIG. 1) transitions the signal $S_2$ to an active logic-high level and the signal $S_4$ to an inactive logic-low level to turn on the transistor 56 and to turn off the transistor 60.

Therefore, because the capacitor 62 is isolated from the inductors 50 and 52, the voltage $V_{C1}$ remains at a constant value, and because both transistors 54 and 56 are on, the current $I_{firstwinding}$ quickly decays to zero along a line 128 of FIG. 5, such that the state of the bidirectional converter 18 has returned to the stable point 110 of FIG. 5 where the current $I_{firstwinding}$ is zero and the voltage $V_{C1}$ is unchanging.

In an embodiment where the inductance $L_2$ of the inductor 52 is significantly (e.g., ten times or more) greater than the leakage inductance $L_{k1}$ of the first-stage winding 44, then one may model the inductor 52 as a current source (sourcing current to the node 34) during the period $D_3$.

Therefore, making this assumption, one may show that the curve 122 and the points 111, 124, and 126 lie on a circle having a center 130 at a point $(V_2 \cdot TR, Z_0 I_{inductor52})$ and a radius $R_2$ given by the following equation:

$$R_2 = \sqrt{(V_{CO2} - V_2 \cdot TR)^2 + (Z_0 I_{inductor52})^2} \quad (13)$$

where $V_{CO2}$ is the value of $V_{C1}$ at the points 111 of FIG. 5 when $I_{firstwinding} = 0$ as discussed above.

And an angle $\theta_4$ between the line 126 and a radius $R_2$ to the point 111 of FIG. 5 is given by the following equation:

$$\theta_4 = \arctan\frac{V_2 \cdot TR - V_{C02}}{Z_0 I_{inductor52}} \quad (14)$$

The point 111 may be non-coincident with the point 110 where the transistors 56 and 60 turn off and on, respectively, at substantially the same time.

In another embodiment, the point 111 may be substantially coincident with the point 110. For example if the transistor 60 turns on at the time $t_5$ as described above, and thus the transistor 60 achieves ZCS, the diode drop across the body diode of the transistor 56 may increase the voltage drop across $L_{k1}$ enough so that a nonzero current $I_{firstwinding}$ begins to flow at substantially the same time as the capacitor 62 begins to discharge (i.e., at substantially the same time as the voltage $V_{C1}$ begins to decrease). Therefore, in such an embodiment equations (13) and (14) reduce to the following equations.

$$R_2 = \sqrt{(V_{co2} - V_2 \cdot TR = 0)^2 + (Z_0 I_{inductor52})^2} = Z_0 I_{inductor52} \quad (15)$$

$$\theta_3 = \arctan\frac{V_{C02} - V_2 \cdot TR = 0}{Z_0 I_{inductor52}} = 0 \quad (16)$$

In yet another embodiment where a nonzero current $I_{firstwinding}$ begins to flow before the capacitor 62 begins to discharge, the point 111 may be above, if only slightly, the point 110 on the line 128, in which case the angle $\theta_4$ remains equal to zero, the radius $R_2$ is reduced from its value in equation (15) by the magnitude of $I_{firstwinding}$ when the capacitor 62 begins to discharge (i.e., when $V_{C1}$ begins to decrease), and there are affectively two points 111, one above the point 110 and one below the point 110 as discussed above. This situation may also occur if the transistor 60 turns on at the time $t_5$, and the voltage across the body diode of the transistor 56 causes a nonzero current $I_{firstwinding}$ to flow before the transistor 60 begins to conduct.

Referring to FIG. 5, one may see that where the duty cycle of the bidirectional converter 18 (FIG. 2) in buck mode is greater than 50%, the plot of the current $I_{firstwinding}$ and the capacitor voltage $V_{C1}$ follows a "distorted" figure eight, starting from point 110, to the point 111, along the curve 112 to the point 116, from the point 116 along the line 118 back to the point 110, from the point 110 to the point 111, along the curve 122 to the point 126, and from the point 126 along the line 128 back to the point 110. Therefore, the current $I_{firstwinding}$ smoothly transitions from one direction to another through the zero-current point 110; consequently, the current $I_{secondwinding}$ through the second-stage winding 46 likewise smoothly transitions through this zero point. And, as discussed below in conjunction with FIG. 6, such a smooth transition of $I_{firstwinding}$ and $I_{secondwinding}$ may also occur when the direction of power transfer changes.

Figure 6:
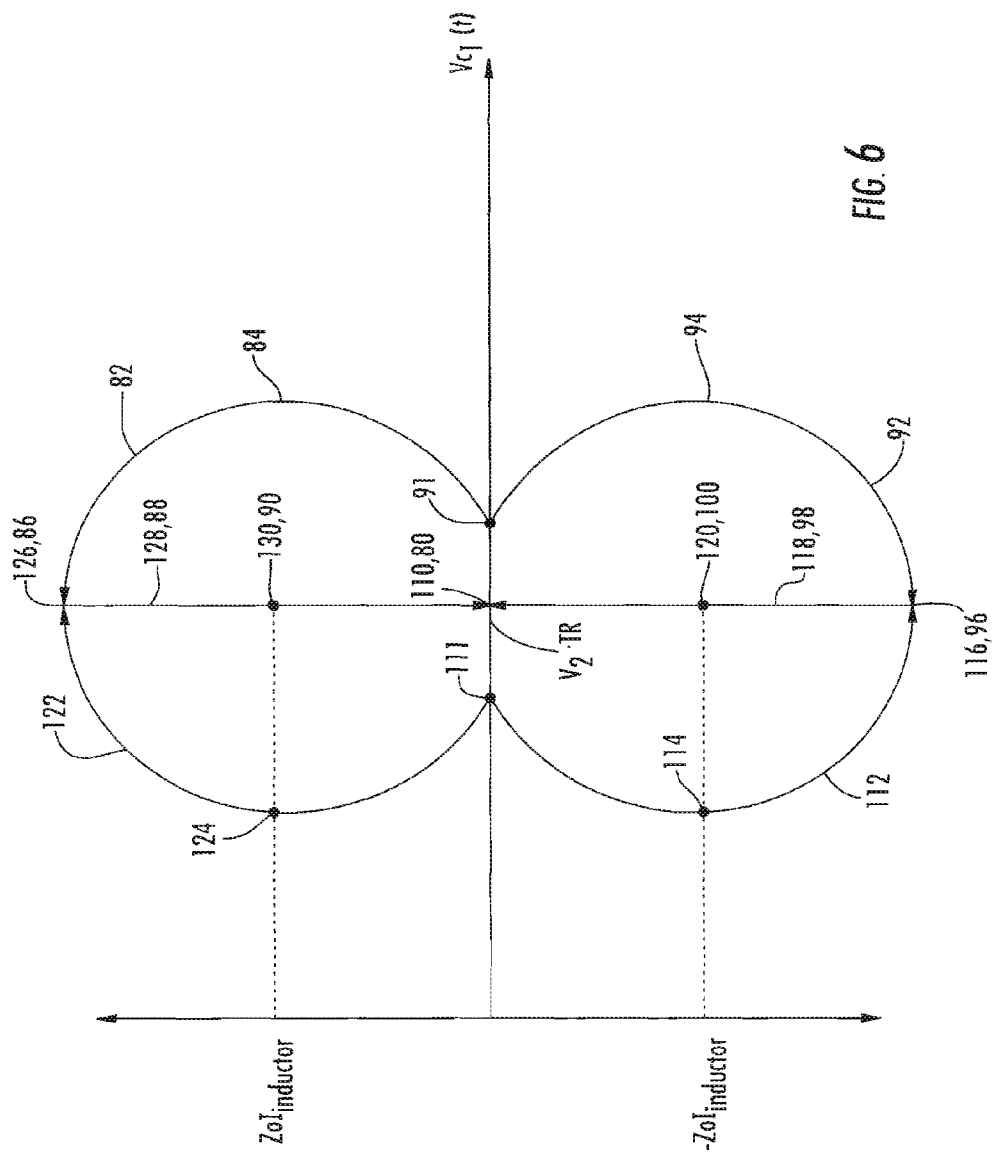
FIG. 6 is a combination of the plots of FIGS. 4 and 5, and shows a transition of an embodiment of the converter stages of FIG. 2 from the buck mode to the boost mode and vice-versa in response to a change in the direction of power transfer.

FIG. 6 is a combination of the plots of FIGS. 4 and 5, and shows a transition of an embodiment of the bidirectional converter 18 of FIG. 2 from the buck mode to the boost mode and vice-versa in response to a change in the direction of power flow. For example purposes, it is assumed that the inductances $L_1$ and $L_2$ of the inductors 50 and 51 of FIG. 2 are approximately equal.

One may see that any change in the direction of power flow between the converter nodes 34 and 36 of FIG. 2 always causes the state of the bidirectional converter 18 to pass though the zero-current point 80, 110, where the currents $I_{firstwinding}$ and $I_{secondwinding}$ through the first and second-stage transformer windings 44 and 46 are approximately zero. Therefore, transitions between directions of power flow are smooth in that they do not cause, or attempt to cause, a step change in transformer current or capacitor voltage.

For example, referring to FIGS. 1 and 6, assume that the system 10 is an automotive system such as a gas-electric hybrid vehicle, the source/loads 12 and 14 are batteries, and at an arbitrary time while the vehicle is moving, the motor/generator 16 is drawing a current from the battery 14 to rotate the vehicle wheels, and that the bidirectional converter 18 is operating in the boost mode along the curve 82 to transfer power from the battery 12 to the battery 14 so as to regulate $V_2$ to a desired level.

Next, assume that a driver of the vehicle 10 applies the brakes such that the motor/generator 16 begins sourcing a current to the converter node 36.

In response to this braking, the bidirectional converter 18 may smoothly change the power-transfer direction to charge the battery 12 by smoothly transitioning from the boost mode of operation to the buck mode of operation along the following path: from the curve 82, to the line 88 via the point 86,126, through the cross-over point 80, 110, through the point 111, and to the curve 112.

Referring to FIGS. 1-6, alternative embodiments of the converter 18 are contemplated. For example, although shown as being equal, $R_1$ need not equal $R_2$, $|V_{C01}|$ need not equal $|V_{C02}|$, and thus the magnitudes of $\theta_1$-$\theta_4$ need not be equal; smooth transitions between portions of the switching cycle and from one mode to another mode may still occur even if one or more of such inequalities exist. Furthermore, these parameters may even be unequal for each half circle. For example, $R_1$ for the curve 82 may be different than $R_1$ for the curve 92, such that $VC_{O1}$ for the curve 82 may be different than $VC_{O1}$ for the curve 92, and $\theta_1$ may be different than $\theta_2$; similarly, $R_2$ for the curve 122 may be different than $R_2$ for the curve 112, such that $V_{CO2}$ for the curve 122 may be different than $V_{CO2}$ for the curve 112, and $\theta_3$ may be different than $\theta_4$. Again, smooth transitioning between portions of the switching cycle and from one mode to the other mode may still occur even if one or more such inequalities exist.

Figure 7:
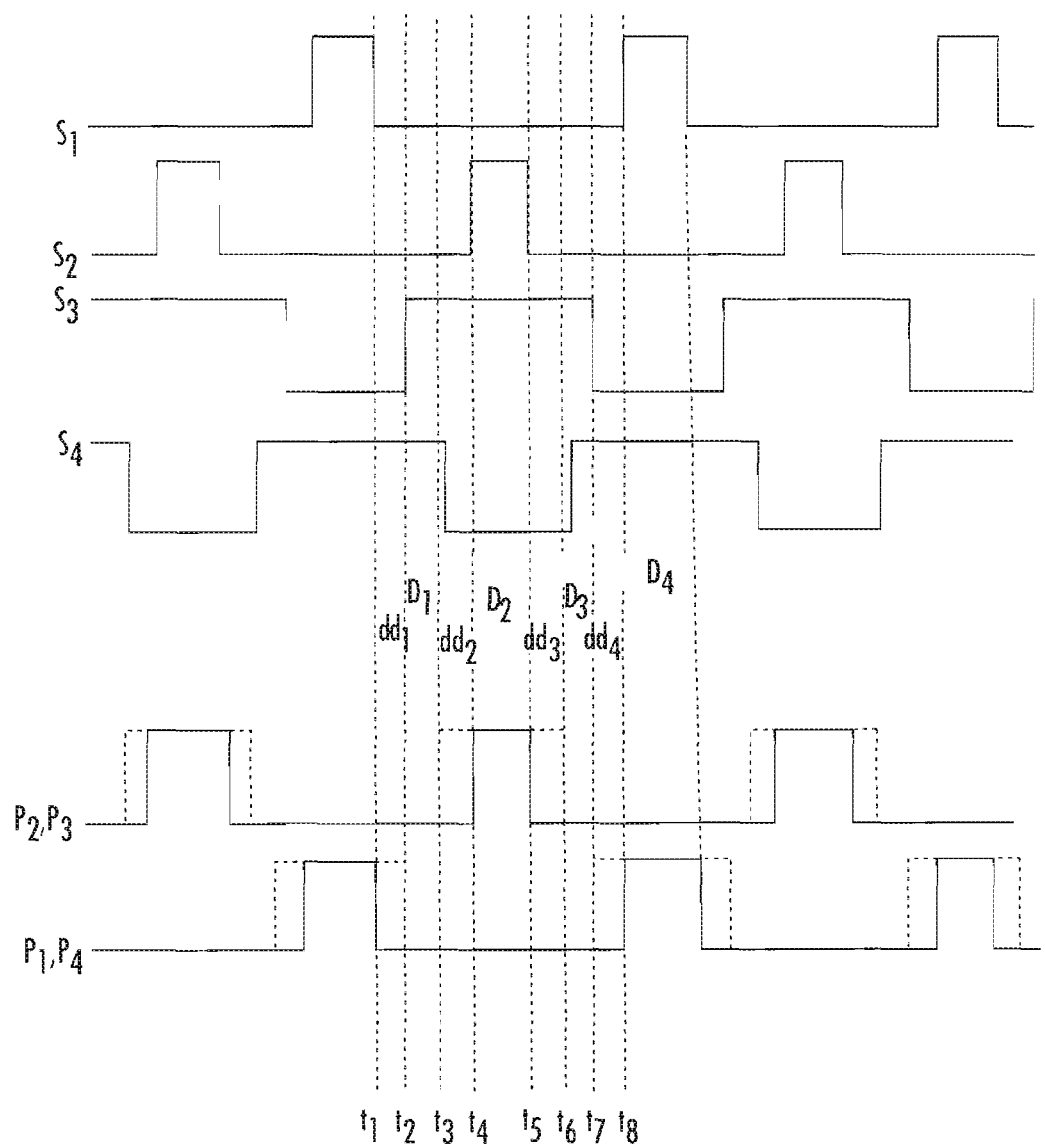
FIG. 7 is a timing diagram of the switching signals for an embodiment of the converter stages of FIG. 2 operating at a duty cycle of less than 50%.

FIG. 7 is a timing diagram of the signals $S_1$-$S_4$ and $P_1$-$P_4$ of an embodiment of the converter 18 of FIG. 2 while the duty cycle of the converter is less than 50%, and while the signal timing, for example the duty cycle, may be independent of the direction of power flow. As in the embodiment discussed above in conjunction with FIGS. 2 and 3, the duty cycle is defined as the ratio of the high portion of the $S_1$ switching period to the total $S_1$ switching period, although it may be defined differently in other embodiment.

Referring to FIGS. 2 and 7, discussed is an operational mode of an embodiment of the converter 18 where the converter has a steady-state duty cycle of less than 50% and is transferring power from the converter node 34 to the converter node 36 (i.e., from the first converter stage 20 to the second converter stage 22). In this mode of operation, the first converter stage 20 operates as a boost converter, and the second converter stage 22 operates as a synchronous full-wave rectifier. Furthermore, the delay periods $dd_x$ are fixed durations that are independent of the duty cycle, and that may be generated by the controller 30 to allow at least some of the transistors to achieve at least approximately zero-voltage switching (ZVS) or zero-current switching (ZCS) as described below. In contrast, the periods Dx depend on the duty cycle. Moreover, the delay periods $dd_x$, the periods Dx, and the times $t_x$ do not necessarily correspond to the delay periods $dd_x$, periods Dx, and the times $t_x$ of FIG. 3.

At a time $t_1$, the signal $S_1$ is inactive low, the signal $S_2$ is inactive low, the signal $S_3$ is transitioning from inactive low to active high, and the signal $S_4$ is active high; therefore, the transistors 54 and 56 are off, the transistor 58 is turning on, and the transistor 60 is on. Furthermore, the signals $P_1$ and $P_4$ are transitioning from active high to inactive low, and the signals $P_2$ and $P_3$ are inactive low: therefore, the transistors 64 and 70 are transitioning from on to off, and the transistors 66 and 68 are off. Alternatively, the signals $P_1$ and $P_4$ may have transitioned from active high to inactive low at a time $t_0$.

Because the transistor 54 has been off for at least a delay time $dd_1$ before the transistor 58 turns on, at least a portion of the boost current flowing from the inductor 50 is flowing through the body diode of the transistor 58.

Therefore, while the transistor 58 is turning on, it achieves at least approximately ZVS.

Also regardless of whether the transistors 64 and 70 turn off at time $t_0$ or at time $t_1$, any residual current $-I_{secondwinding}$ flowing through the second-stage winding 46 (e.g., due to leakage inductance $L_{K2}$ or $L_{K1}$ may dissipate through the body diodes of these transistors.

During a period $D_1$, the signals $S_1$ and $S_2$ are inactive low, and the signals $S_3$ and $S_4$ are active high; therefore, the transistors 54 and 56 are off, and the transistors 58 and 60 are on. Furthermore, the signals $P_1$-$P_4$ are inactive low; therefore, the transistors 64-70 are off. Referring to FIG. 3, the signals $P_1$ and $P_4$ generally have the same level as $S_4$, and the signals $P_2$ and $P_3$ generally have the same level as $S_3$, when the duty cycle of the bidirectional converter 18 is greater than 50%. But if this were the case when the duty cycle of the converter 18 is less than 50%, then there may be periods during which $P_1$-$P_4$ are all active high simultaneously, which would cause all of the transistors 64-70 to be on simultaneously, thus shorting out the capacitor 72. Therefore, to prevent this, the controller 30 may insure that $P_1$ and $P_4$ are never active high at the same time as $P_2$ and $P_3$ are active high. For example, the controller 30 may force $P_1$-$P_4$ inactive low whenever both $S_3$ and $S_4$ are active high (an embodiment of overlap-protection circuit for realizing this function is described below in conjunction with FIG. 8A).

Therefore, the boost currents from the inductors 50 and 52 charge the capacitor 62 via the on transistors 58 and 60.

Moreover, because the first-stage winding 44 has its end nodes connected together by the on transistors 58 and 60, the currents $I_{firstwinding}$ and $I_{secondwinding}$ through the first-stage and second-stage windings 44 and 46 decay to zero.

At a time $t_2$, the signal $S_4$ transitions to inactive low, thus turning off the transistor 60. Any boost current that was flowing from the inductor 52 into the capacitor 62 via the transistor 60 now flows through the body diode of the transistor 60. Because there is no more than about 0.7 V across the first-stage winding 44, the currents $-I_{firstwinding}$ and $I_{secondwinding}$ are relatively small, e.g., zero.

Also at the time $t_2$, the signals $P_2$ and $P_3$ transition to active high, thus turning on the transistors 66 and 68, which achieve at least approximately ZCS. Alternatively, the signals $P_2$ and $P_3$ may transition to active high, thus turning on the transistors 66 and 68, at a time $t_3$ and still achieve at least approximately ZCS.

At the time $t_4$, the signal $S_2$ transitions active high, thus turning on the transistor 56, which achieves at least approximately ZCS.

During a period $D_2$, the on transistors 56 and 58 clamp the voltage across the first-stage winding 44 to $V_{C1}$, which thus also clamps the voltage across the second-stage winding 46 to $V_{C1}\times$ the turns ratio TR of the transformer 24 as seen from the first-stage side.

Initially during the period $D_2$, the boost current from the inductor 50 is greater than $I_{firstwinding}$, so the excess portion of the boost current continues to flow through the transistor 58 and into the capacitor 62, thus increasing $V_{C1}$.

But because the on transistors 56 and 58 clamp $V_{C1}$ across the first-stage winding 44, the current $I_{firstwinding}$ increases as time passes during the period $D_2$.

Therefore, at a subsequent time during the period $D_2$, $I_{firstwinding}$ exceeds the boost current from the inductor 50. Therefore, the excess portion of $I_{firstwinding}$, which equals the difference between the boost current from the inductor 50 and $I_{firstwinding}$, is sourced by the capacitor 62, thus causing $V_{C1}$ to decrease.

Also during the period $D_2$, a charging current flows through the inductor 52 and the transistor 56 to ground.

At the time $t_4$, the signal $S_2$ transitions from active high to inactive low, thus turning off the transistor 56.

Furthermore, at the time $t_4$ or at a time $t_5$, the signals $P_2$ and $P_3$ transition from active high to inactive low, thus turning off the transistors 66 and 68.

During a delay period $dd_3$, the boost current through the inductor 52, which during the period $D_2$ was flowing through the transistor 56, now flows through the body diode of the transistor 60. The duration of the period $dd_3$ may be at least long enough to allow the body diode of the transistor 60 to begin to conduct.

At the time $t_5$, the signal $S_4$ transitions from inactive low to active high, thus turning on the transistor 60. Because the boost current from the inductor 52 is already flowing through the body diode of the transistor 60, this transistor achieves at least approximately ZVS.

During a period $D_3$, the boost currents from the inductors 50 and 52 charge the capacitor 62 via the on transistors 58 and 60.

Furthermore, because the first-stage winding 44 has its end nodes connected together by the on transistors 58 and 60, the currents $I_{firstwinding}$ and $I_{secondwinding}$ through the first- and second-stage windings 44 and 46 decay to approximately zero.

At a time $t_6$, the signal $S_3$ transitions to inactive low, thus turning off the transistor 58. Any boost current that was flowing from the inductor 50 into the capacitor 62 via the transistor 58 now flows through the body diode of the transistor 58. Because there is no more than about 0.7 V across the first-stage winding 44, the currents $I_{firstwinding}$ and $I_{secondwinding}$ are relatively small, or are zero.

Also at the time $t_6$, the signals $P_1$ and $P_4$ transition to active high, thus turning on the transistors 64 and 70, which achieve at least approximately ZCS. Alternatively, the signals $P_1$ and $P_4$ may transition to active high, thus turning on the transistors 64 and 70, at a time $t_7$, and still achieve at least approximately ZCS.

At the time $t_7$, the signal $S_1$ transitions to active high, thus turning on the switch 54, which achieves at least approximately ZCS.

During a period $D_4$, the on transistors 54 and 60 clamp the voltage across the first-stage winding 44 to $-V_{C1}$, which thus also clamp the voltage across the second-stage winding 46 to $-V_{C1}\times$ the turns ratio TR of the transformer 24 as seen from the first-stage side.

Initially during $D_4$, the boost current from the inductor 52 is greater than $-I_{firstwinding}$, so the excess portion of the boost current continues to flow through the transistor 60 and into the capacitor 62, thus increasing $V_{C1}$.

But because the on transistors 54 and 60 clamp $-V_{C1}$ across the first-stage winding 44, the magnitude of the current $-I_{firstwinding}$ increases as time passes during the period $D_4$.

Therefore, at a subsequent time during $D_4$, the magnitude of $-I_{firstwinding}$ exceeds the boost current from the inductor 52. Consequently, the excess portion of $-I_{firstwinding}$, which equals the difference between the boost current from the inductor 52 and the magnitude of $-I_{firstwinding}$, is sourced by the capacitor 62, thus causing $V_{C1}$ to decrease.

Also during the period $D_4$, a charging current flows through the inductor 50 and transistor 54 to ground.

At a time $t_8$, the signal $S_1$ transitions from active high to inactive low, thus turning off the transistor 54.

Then the above-described cycle repeats.

Referring again to FIGS. 2 and 7, now described is an operational mode of an embodiment of the converter 18 where the converter has a steady-state duty cycle of less than 50% and is transferring power from the converter node 36 to the converter node 34 (i.e., from the second converter stage 22 to the first converter stage 20). In this mode of operation, the first converter stage 20 operates as a buck converter, and the second converter stage 22 operates as a DC-AC converter. As discussed below, the switching sequence of FIG. 7 allows at least some of the transistors of the bidirectional converter 18 to achieve at least approximately ZVS or ZCS, which may improve the efficiency of the converter as compared to a conventional converter.

At the time $t_1$, the signal $S_1$ is inactive low, the signal $S_2$ is inactive low, the signal $S_3$ is transitioning from inactive low to active high, and the signal $S_4$ is active high; therefore, the transistors 54 and 56 are off, the transistor 58 is turning on, and the transistor 60 is on. Furthermore, the signals $P_1$ and $P_4$ are transitioning from active high to inactive low, and the signals $P_2$ and $P_3$ are inactive low: therefore, the transistors 64 and 70 are transitioning from on to off, and the transistors 66 and 68 are off. Alternatively, the signals $P_1$ and $P_4$ may have transitioned from active high to inactive low at the time $t_0$.

Because there is no current flowing through it or its body diode, the transistor 58 achieves at least approximately ZCS.

Also regardless of whether the transistors 64 and 70 turn off at $t_0$ or $t_1$, any current $I_{secondwinding}$ still flowing through the second-stage winding 46 may dissipate through the body diodes of the transistors 66 and 68.

During the period $D_1$, the signals $S_1$ and $S_2$ are inactive low, and the signals $S_3$ and $S_4$ are active high; therefore, the transistors 54 and 56 are off, and the transistors 58 and 60 are on. Furthermore, the signals $P_1$-$P_4$ are inactive low therefore, the transistors 64-70 are off. Referring to FIG. 3, the signals $P_1$ and $P_4$ generally have the same level as $S_4$, and the signals $P_2$ and $P_3$ generally have the same level as $S_3$, when the duty cycle of the bidirectional converter 18 is greater than 50%. But if this were the case when the duty cycle of the converter 18 is less than 50%, then there may be periods during which $P_1$-$P_4$ are all active high simultaneously, which would cause all of the transistors 64-70 to be on simultaneously, thus shorting out the capacitor 72. Therefore, to prevent this, the controller 30 may insure that $P_1$ and $P_4$ are never active high at the same time as $P_2$ and $P_3$ are active high. For example, the controller 30 may force $P_1$-$P_4$ inactive low whenever both $S_3$ and $S_4$ are active high (an embodiment of a circuit for realizing this overlap-protection function is described below in conjunction with FIG. 8B).

Therefore, the capacitor 62 discharges via the on transistors 58 and 60 to source the buck currents flowing through the inductors 50 and 52 to the node 34. In this state, the first converter stage 20 operates as a current multiplier (a current doubler in this embodiment).

Moreover, because the winding 44 has its end nodes connected together by the on transistors 58 and 60, the currents $I_{firstwinding}$ and $I_{secondwinding}$ through the windings 44 and 46 decay to substantially zero.

At the time $t_2$, the signal $S_4$ transitions to inactive low, thus turning off the transistor 60. Any buck current that was flowing into the inductor 52 from the capacitor 62 via the transistor 60 now flows through the body diode of the transistor 56.

Also at the time $t_2$, the signals $P_2$ and $P_3$ transition to active high, thus turning on the transistors 66 and 68, which achieve at least approximately ZCS. Alternatively, the signals $P_2$ and $P_3$ may transition to active high, thus turning on the transistors 66 and 68, at the time $t_3$. In this alternative scenario, because approximately the voltage $V_{C1}$ is across the first-stage winding 44 (via the transistor 58 and the body diode of the transistor 56), a current $I_{firstwinding}$ may begin to flow through the first-stage winding, and thus a current $I_{secondwinding}$ may begin to flow through the second-stage winding 46. However, $I_{secondwinding}$ will flow through the body diodes of the transistors 66 and 68 such that when they turn on, they will achieve at least approximately ZVS.

At the time $t_3$, the signal $S_2$ transitions active high, thus turning on the switch 56, which achieves at least approximately ZVS due to the inductor 52 buck current flowing through its body diode per above.

During the period $D_2$, the on transistors 66 and 68 clamp the voltage across the second-stage winding 46 to $V_2$, which thus also clamps the voltage across the first-stage winding 44 to $V_2 \times$ the turns ratio TR of the transformer 24 as seen from the second-stage side.

Initially during the period $D_2$, the buck current through the inductor 50 is greater than $-I_{firstwinding}$, so the excess portion of the buck current continues to flow through the on transistor 58 and discharge the capacitor 62, thus decreasing $V_{C1}$.

But because the on transistors 66 and 68 clamp $V_2$ across the first second-stage winding 46, the currents $-I_{secondwinding}$ and $-I_{firstwinding}$ increase as time passes during the period $D_2$.

Therefore, at a subsequent time during the period $D_2$, $-I_{firstwinding}$ exceeds the buck current into the inductor 50. Therefore, the excess portion of $-I_{firstwinding}$, which equals the difference between the buck current into the inductor 50 and the magnitude of $-I_{firstwinding}$, flows into the capacitor 62, thus causing $V_{C1}$ to increase.

Also during the period $D_2$, a discharge current flows from ground through the transistor 56 and the inductor 52.

At the time $t_4$, the signal $S_2$ transitions from active high to inactive low, thus turning off the transistor 56.

Furthermore, at the time $t_4$ or $t_5$, the signals $P_2$ and $P_3$ transition from active high to inactive low, thus turning off the transistors 66 and 68.

During the delay period $dd_3$, the buck current through the inductor 52, which during the period $D_2$ was flowing through the transistor 56, now flows through the body diode of the transistor 56. Alternatively, the turning off of the transistor 56 may be delayed until the time $t_5$ to reduce the amount of time during which the buck current flows through the body diode of this transistor, which may improve the efficiency of the converter 18.

At the time $t_5$, the signal $S_4$ transitions from inactive low to active high, thus turning on the transistor 60. Because no current is flowing through the transistor 60 or its body diode, this transistor achieves at least approximately ZCS During the period $D_3$, the buck currents into the inductors 50 and 52 discharge the capacitor 62 via the on transistors 58 and 60. Therefore, in this state, the first converter stage 20 operates as a current multiplier.

Furthermore, because the first-stage winding 44 has its end nodes coupled together by the on transistors 58 and 60, the currents $-I_{firstwinding}$ and $-I_{secondwinding}$ decay to approximately zero (the current $-I_{secondwinding}$ may decay through the body diodes of the transistors 64 and 70).

At the time $t_6$, the signal $S_3$ transitions to inactive low, thus turning off the transistor 58. Any buck current that was flowing into the inductor 50 from the capacitor 62 via the transistor 58 now flows through the body diode of the transistor 54.

Also at the time $t_6$, the signals $P_1$ and $P_4$ transition to active high, thus turning on the transistors 64 and 70, which achieve at least approximately ZCS. Alternatively, the signals $P_1$ and $P_4$ may transition to active high, thus turning on the transistors 64 and 70, at the time $t_7$. In this alternative, because the voltage $V_{C1}$ is across the first-stage winding 44 (via the transistor 60 and the body diode of the transistor 54), a current $-I_{firstwinding}$ may begin to flow through the first-stage winding, and thus a current $-I_{secondwinding}$ may begin to flow through the second-stage winding 46. However, $-I_{secondwinding}$ will flow through the body diodes of the transistors 64 and 70 such that when they turn on at the time $t_7$, they will achieve at least approximately ZVS.

At the time $t_7$, the signal $S_1$ transitions active high, thus turning on the switch 54, which achieves at least approximately ZVS due to the buck current into the inductor 50 flowing through its body diode per above.

During the period $D_4$, the on transistors 64 and 70 clamp the voltage across the second-stage winding 46 to $V_2$, which thus also clamps the voltage across the first-stage winding 44 to $V_2$ the turns ratio TR of the transformer 24 as seen from the second-stage side.

Initially during the period $D_4$, the buck current into the inductor 52 is greater than $I_{firstwinding}$, so the excess portion of the buck current continues to flow through the transistor 60 from the capacitor 62, thus decreasing $V_{C1}$.

But because the on transistors 64 and 70 clamp $V_2$ across the second-stage winding 46, the magnitude of the current $I_{secondwinding}$, and thus the magnitude of the current $I_{firstwinding}$, increase as time passes during the period $D_4$.

Therefore, at a subsequent time during the period $D_4$, the magnitude of $I_{firstwinding}$ exceeds the buck current into the inductor 52. Consequently, the excess portion of $I_{firstwinding}$, which equals the difference between the buck current into the inductor 52 and the magnitude of $I_{firstwinding}$, flows into (i.e., charges) the capacitor 62, thus causing $V_{C1}$ to increase.

At the time $t_8$, the signal $S_1$ transitions from active high to inactive low, thus turning off the transistor 54.

Furthermore, the transistors 64 and 70 turn off at either time $t_8$ or $t_9$.

Alternatively, the controller 30 may transition the signal $S_1$ to inactive low at the time $t_9$ to reduce the time during which the inductor 50 buck current flows through the body diode of the transistor 54.

Then the above-described cycle repeats.

Still referring to FIGS. 2 and 7, the bidirectional converter 18, when operating with a duty cycle of less than 50%, may provide advantages similar to those described above in conjunction with FIG. 3 for operation with a duty cycle of greater than 50%, such as each transistor achieving at least approximately ZVS or ZCS when the controller 30 switches it, clamping of the windings 44 and 46 to $V_{C1}$ and $V_2$, respectively, and smooth transition between power-flow directions in a manner similar to that described above in conjunction with FIG. 6.

Still referring to FIGS. 2 and 7, alternate embodiments of the operation with duty cycle of less than 50% are contemplated. For example, any of the delay periods $dd_x$ may be eliminated, for example, if an eliminated delay period is not needed to allow one or more of the transistors to achieve at least approximately ZVS or ZCS. Furthermore, the timing of one of the signals $S_1$-$S_4$ and $P_1$-$P_4$ may be adjusted, for example, to improve the efficiency of the converter 18.

Referring again to FIGS. 2, 3, and 7, the bidirectional converter 18 may also operate with a duty cycle of approximately 50%. In such an operating mode, the overlap between the signals $S_1$ and $S_2$ would be small or zero, as would the overlap between the signals $S_3$ and $S_4$. Consequently, one or more of the transistors 54-60 may be unable to achieve at least approximately ZVS, and the currents $I_{firstwinding}$ and $I_{secondwinding}$ through the windings 44 and 46 may have insufficient time to decay to approximately zero, in which case one or more of the transistors 64-70 may be unable to achieve at least approximately ZCS. But in at least most cases, the current $I_{secondwinding}$ through the winding 46 that would have otherwise decayed to approximately zero allows the transistors 64-70 to achieve at least ZVS. It is believed, however, that in most applications, the amount of time that the converter 18 will operate at approximately 50% duty cycle is relatively small compared to the total operating time; therefore, it is believed that the converter 18 may operate with an overall higher efficiency than a conventional bidirectional converter, even if it operates with an approximately 50% duty cycle during some periods.

Figure 8A:
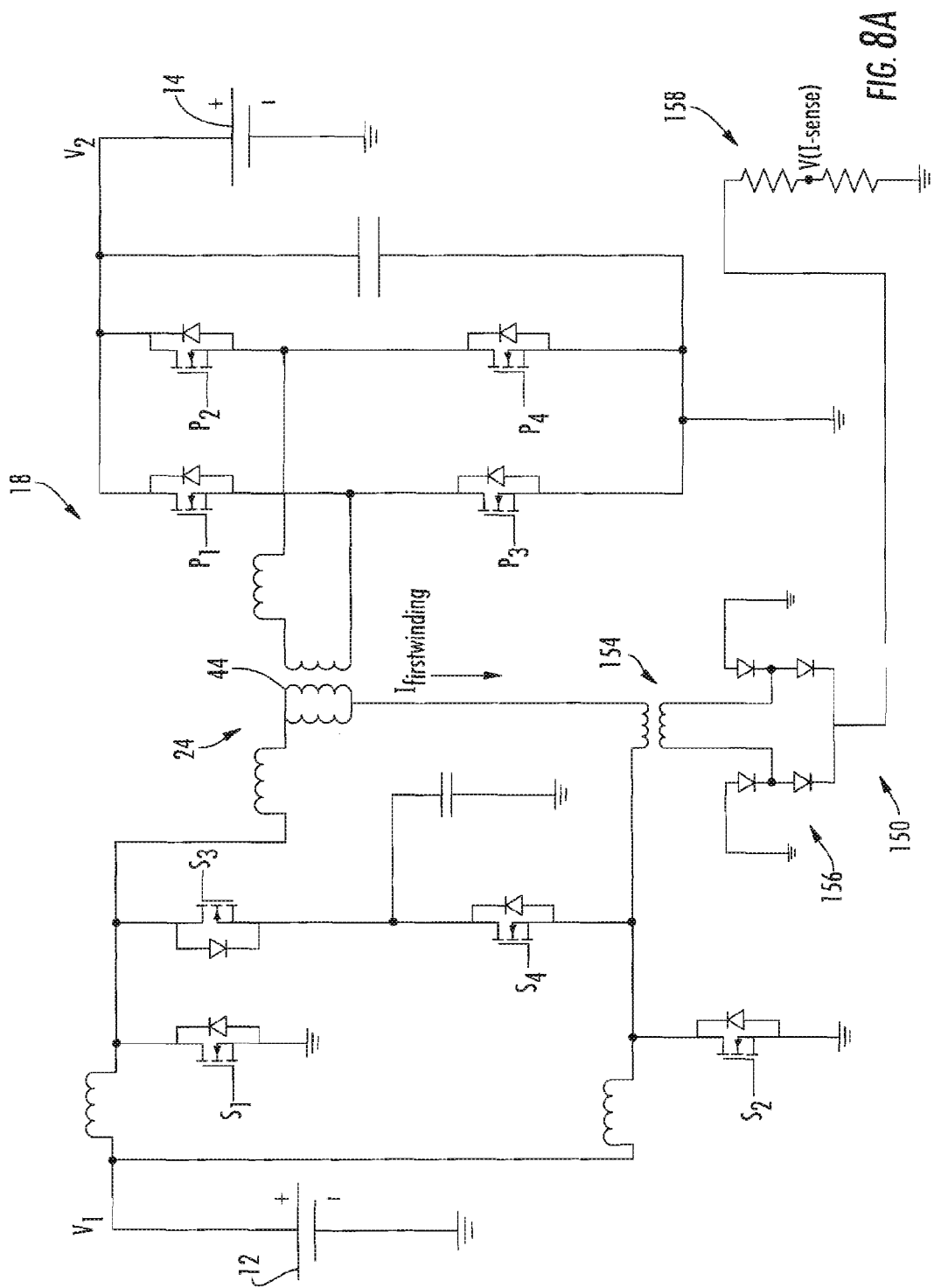
FIG. 8A is a schematic diagram of the converter stages and transformer of FIG. 2, and an embodiment of a current sensor coupled to the converter stages for sensing the total first-stage transformer current.
Figure 8B:
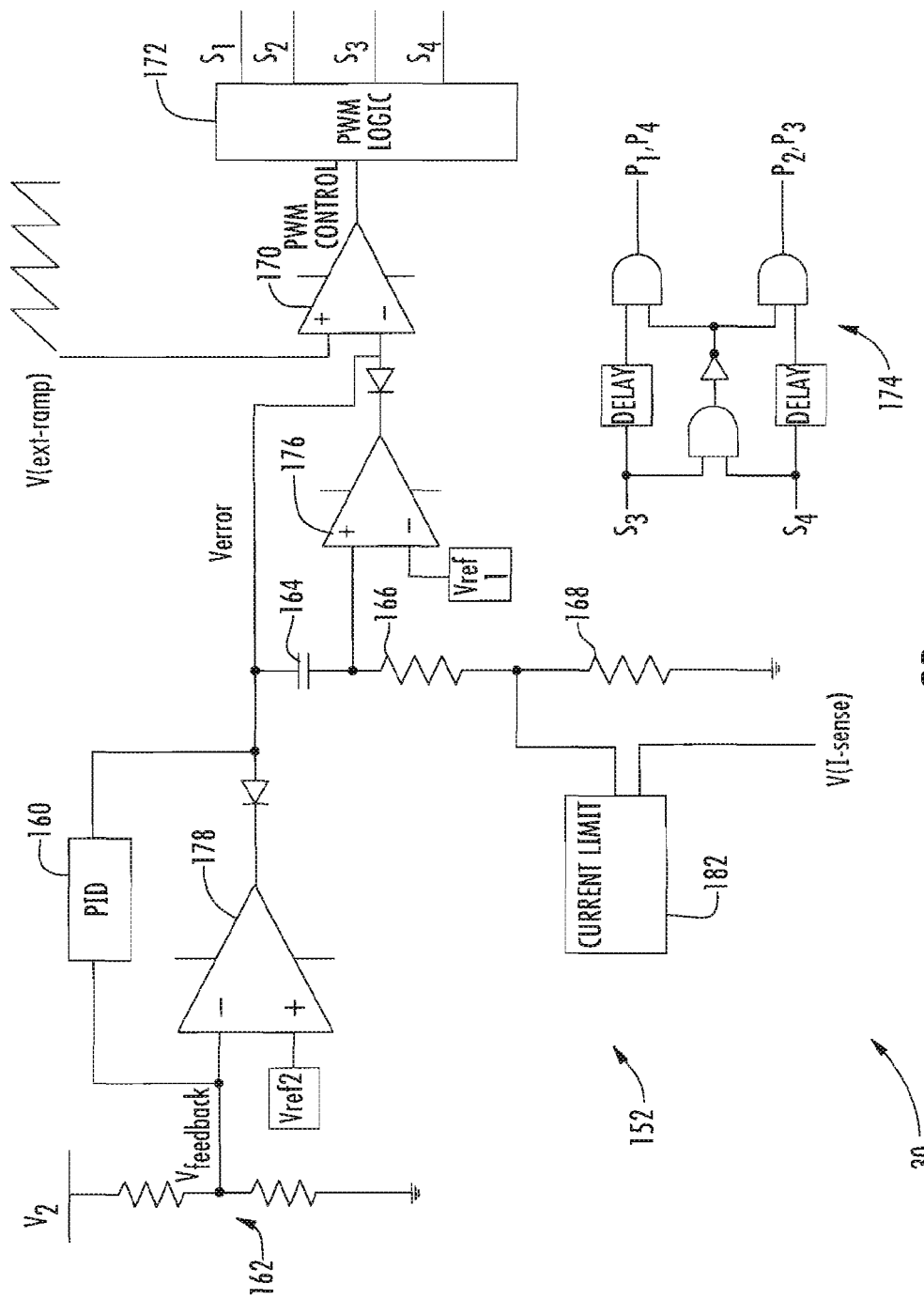
FIG. 8B is a schematic diagram of an embodiment of the controller of FIG. 1 for controlling the converter stages of FIGS. 2 and 8A.

FIGS. 8A and 8B are a schematic diagram of the converter stage 20 and 22 and transformer 24 of FIG. 2, an embodiment of the controller 30 of FIG. 1, a current-sense circuit 150, and the source/loads 12 and 14 of FIG. 1 where these source loads are respective batteries.

The controller 30 includes control circuitry 152 for generating the switching signals $S_1$-$S_4$ and $P_1$-$P_4$, and the controller may also include the current-sense circuit 150.

In operation of the current-sense circuit 150, a transformer 154 couples the current $I_{firstwinding}$ through the first-stage winding 44 of the transformer 24 to a bridge 156 and voltage divider 158, which generates a voltage V(Isense) that is proportional to a current flowing through the first-stage winding 44, and that has twice the switching frequency (i.e., twice the frequency of any of the switching signals $S_1$-$S_4$ and $P_1$-$P_4$).

In operation of the control circuitry 152 during a mode of operation where the motor/generator 16 (FIG. 1) is operating as a motor, or is generating a relatively small output current, a PID circuit 160 conventionally provides compensation by generating an error signal $V_{error}$ from a voltage $V_{feedback}$ from a voltage-control loop, wherein $V_{feedback}$ is generated by a voltage divider 162 to be proportional to $V_2$, and a capacitor 164 and resistors 166 and 168 set the compensation of a current control loop. A comparator 170 compares $V_{error}$ to an externally provided signal V(ext-ramp) (V(ext-ramp) may be a PWM ramp from which the controller 30 of FIG. 1 may generate the signals $S_1$-$S_4$ and $P_1$-$P_4$ per below), and generates a PWM Control signal in response to this comparison. In response to the PWM Control signal, a first logic circuit 172 generates the switching signals $S_1$-$S_4$, and in response to the signals $S_3$ and $S_4$, a second logic circuit 174 generates the switching signals $P_1$-$P_4$ such that $P_1$ and $P_4$ have little or no overlap with $P_2$ and $P_3$ (preventing such overlap may prevent $V_2$ from be connected directly to, e.g., ground).

In operation of the control circuitry 152 during a boost mode of operation when the motor/generator 16 (FIG. 1) is generating an intermediate amount of current that causes the "−" input of the amplifier 176 to become higher than a reference voltage Vref1, then an amplifier 176 pulls down the inverting input node of the comparator 170 to decrease the duty cycle of the PWM control signal, and to thus decrease the duty cycle of $S_1$ and $S_2$. This action allows the bidirectional converter 18 to react relatively quickly to a relatively sudden, but relatively modest, increase in $V_2$ so as to maintain $V_2$ in regulation by transferring excess charging current (current not needed to charge the battery 14) from the motor/generator 16 to the battery 12.

In operation of the control circuitry 152 during a boost mode of operation when the motor/generator 16 (FIG. 1) is generating a relatively high amount of voltage that causes $V_{feedback}$ to become higher than a reference voltage Vref2, an amplifier 178 pulls down the inverting input node of the comparator 170 to decrease the duty cycle of the PWM control signal, and to thus decrease the duty cycle of $S_1$ and $S_2$. This action allows the bidirectional converter 18 to react even more quickly to a relatively sudden and significant increase in the voltage $V_2$ so as to maintain $V_2$ in regulation by transferring excess charging current (current not needed to charge the battery 14) from the motor/generator 16 to the battery 12.

Furthermore, a current-limit circuit 182 may prevent the current into or out from the converter node 36 from exceeding a maximum safe value. The current-limit circuit 182 may also limit the current charging the battery 14 to a maximum safe value.

During a buck mode of operation, the control circuit 152 may operate similarly, but to increase the duty cycle of $S_1$ and $S_2$.

Alternate embodiments of the controller 30 (and current-sense circuit r 150 if not part of the controller) are contemplated. For example, any number of the components of the controller 30 may be disposed on a same or different integrated circuit (IC), and at least one of these ICs may also include at least one of the other components (e.g., one or more of the transistors 54-60 and 64-70) of the converter 18. For example, at least the comparator 170, logic circuit 172, and amplifier 176 may be disposed on an Intersil® ISL6742 power-supply-controller IC.

Figure 9:
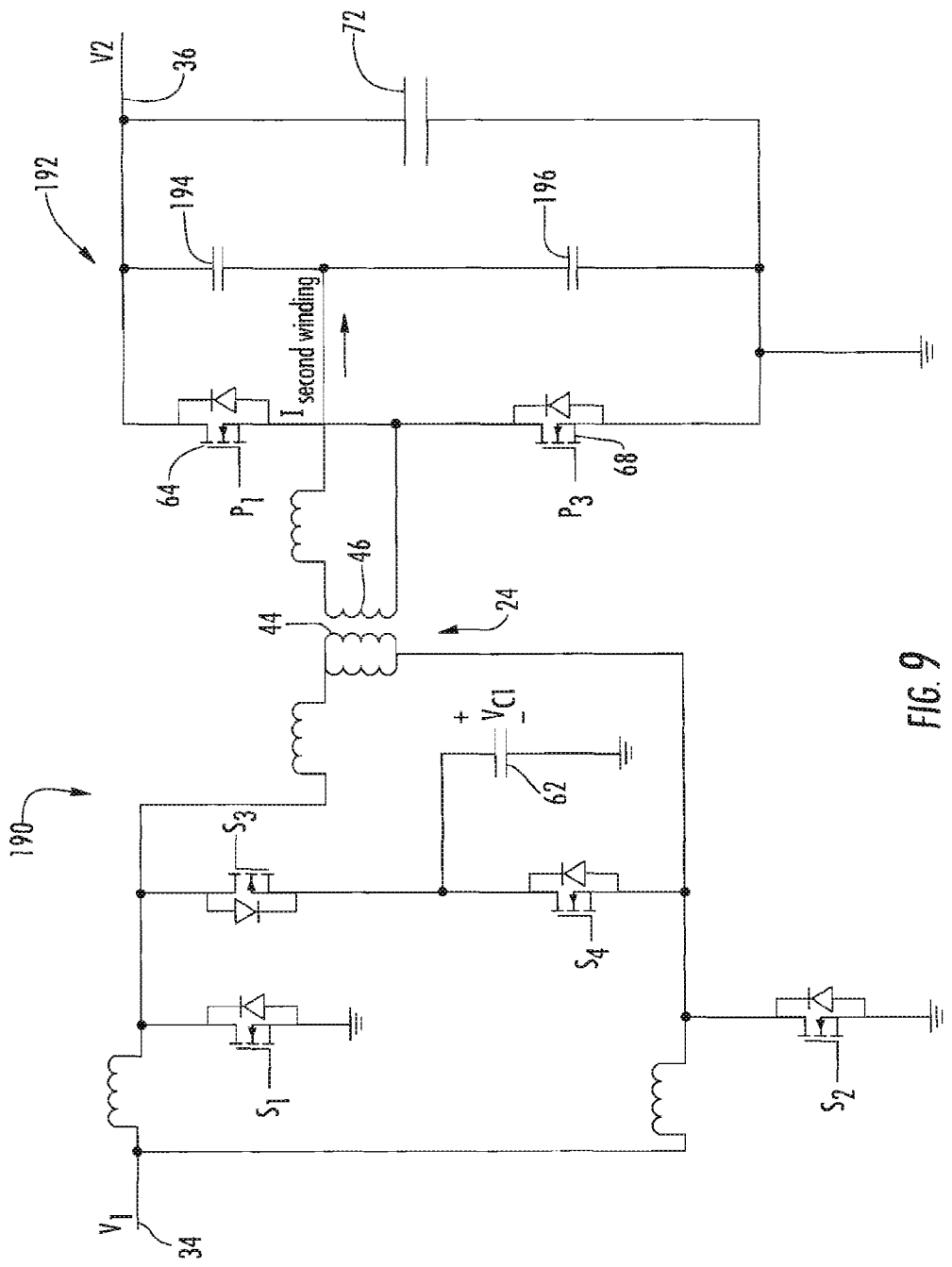
FIG. 9 is a schematic diagram of an embodiment of the converter stages and transformer of FIG. 2, where the second converter stage includes a signal multiplier.

FIG. 9 is a schematic diagram of an embodiment of a bidirectional converter 190, where like numbers refer to components common to the bidirectional converter 18 of FIG. 2. The converter 190 is similar to the converter 18 except that the second converter stage 22 of FIG. 2 is replaced with a voltage-doubling stage 192, which effectively doubles the voltage-boosting and voltage-dividing capability of the converter 190 as compared to the converter 18.

The voltage-doubling stage 192 is similar to the second converter stage 22 of FIG. 2 except that the transistors 66 and 70 of the second converter stage 22 are replaced with capacitors 194 and 196 (alternatively, the transistors 66 and 70 may remain, and the transistors 64 and 68 may be replaced with the capacitors). A potential benefit of the stage 192 is that a higher boost or buck ratio may be achieved without increasing the turns ratio of the transformer 24.

In operation, an embodiment of the converter 190 operates similarly to an embodiment of the converter 18 of FIG. 2 as described above in conjunction with FIGS. 2-7 except for the below-described differences, where it is assumed for example purposes that the capacitors 194 and 196 have approximately the same capacitances.

During a boost operating mode while the converter 190 is transferring power from the converter node 34 to the converter node 36 (e.g., charging the battery 14 of FIG. 1 from the battery 12), in a first portion of the switching cycle (e.g., period $D_3$ of FIG. 3), the controller 30 generates $P_1$ active high and $P_3$ inactive low to turn on the transistor 64 and turn off the transistor 68 such that the current $-I_{secondwinding}$ charges the capacitor 194 to a voltage approximately equal to $V_{C1} \times$ the turns ratio TR of the transformer 24 as seen from the first-stage side. Similarly, in a second portion of the switching cycle (e.g., period $D_1$ of FIG. 3), the controller 30 generates $P_1$ inactive low and $P_3$ active high to turn off the transistor 64 and turn on the transistor 68 such that the current $I_{secondwinding}$ charges the capacitor 196 to a voltage approximately equal to $V_{C1} \times$ the turns ratio of the transformer 24.

Therefore, during a boost mode of operation, the converter 190 generates $V_2 \approx 2V_{C1} \times$(turns ratio of transformer 24), which, for a same value of $V_{C1}$, is double the value that the converter 18 of FIG. 2 generates for $V_2$. Therefore, for a same value of $V_2$, the converter 190 may allow the turns ratio of the transformer 24 to be reduced by up to ½ as compared to the turns ratio of the transformer 24 of the converter 18.

During a buck operating mode while the converter 190 is transferring power from the converter node 36 to the converter node 34 (e.g., charging the battery 12 of FIG. 1 from the battery 14 or with the motor/generator 16), in a first portion of the switching cycle (e.g., period $D_3$ of FIG. 3), the controller 30 generates $P_1$ active high and $P_3$ inactive low to turn on the transistor 64 and turn off the transistor 68 such that the on transistor 64 couples the capacitor 194 across the second winding 46 of the transformer. Therefore, the voltage across the second-stage winding 46 is clamped to approximately $V_2/2$, and the voltage across the first-stage winding 44 of the transformer is clamped to approximately $(V_2/2) \times$(turns ratio of the transformer 24). Similarly, in a second portion of the switching cycle (e.g., period $D_1$ of FIG. 3), the controller 30 generates $P_1$ inactive low and $P_3$ active high to turn off the transistor 64 and turn on the transistor 68 such that the on transistor 68 couples the capacitor 196 across the second-stage winding 46 of the transformer. Therefore, the voltage across the second-stage winding 46 is again clamped to approximately $V_2/2$, and the voltage across the first-stage winding 44 is again clamped to approximately $V_2/(2 \times$(turns ratio of the transformer 24 as seen from the second-stage side)).

Therefore, during a buck mode of operation, the converter 190 generates $V_{C1} \approx V_2/(2 \times$(turns ratio of transformer 24)), which, for a same value of $V_2$, is half the value that the converter 18 of FIG. 2 generates for $V_{C1}$. Therefore, for a same value of $V_2$, the converter 190 may allow the turns ratio of the transformer 24 to be reduced by up to ½ as compared to the turns ratio of the transformer 24 of the converter 18.

Still referring to FIG. 9, alternate embodiments of the bidirectional converter 190 are contemplated. For example, one or more of the embodiments discussed above for the bidirectional converter 18 of FIGS. 2 and 8A may be applicable to the converter 190.

Figure 10:
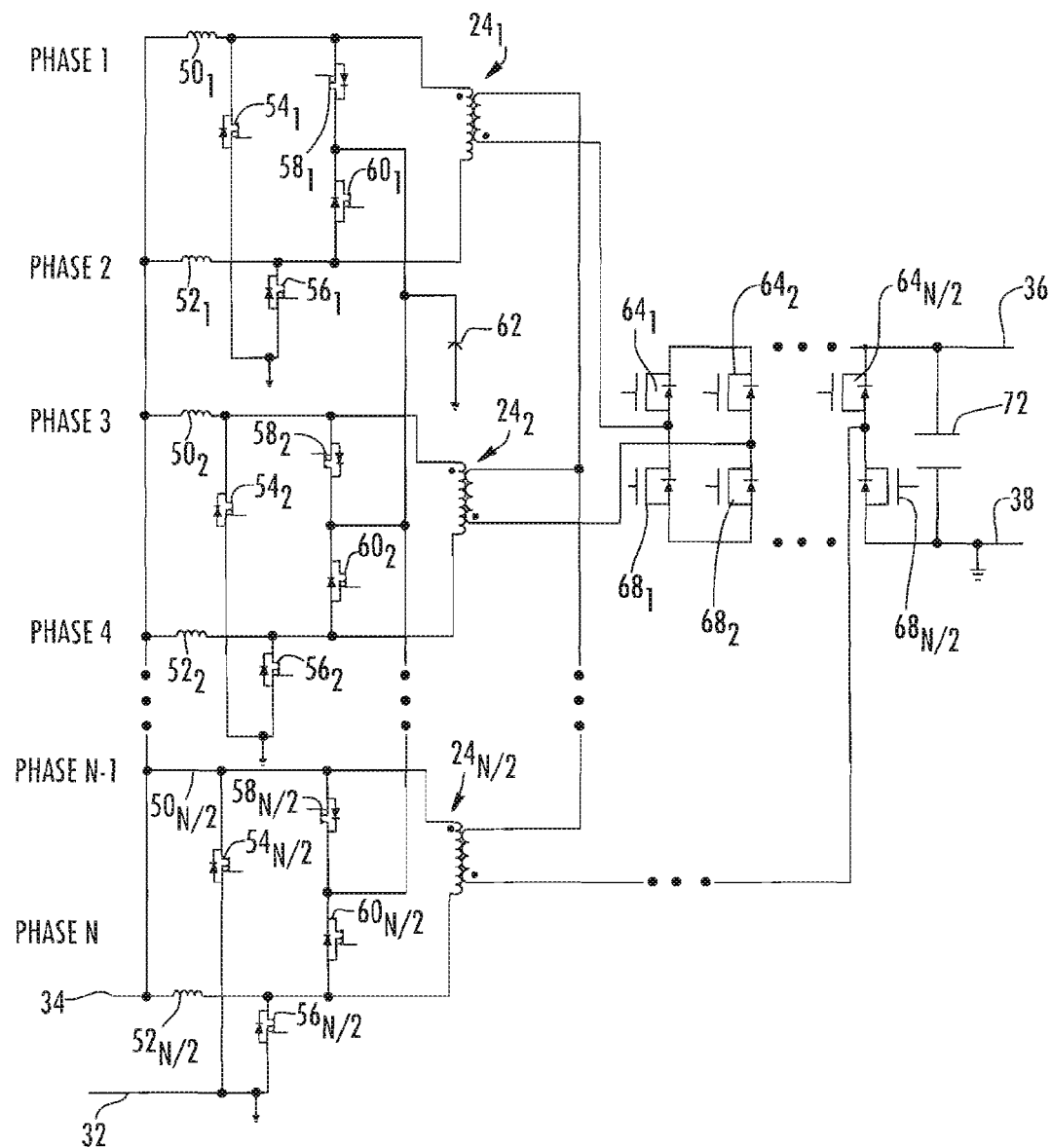
FIG. 10 is a schematic diagram of an embodiment of a bidirectional voltage converter having more than two phases.

FIG. 10 is a schematic diagram of an embodiment of a bidirectional converter 200 having N phases, where N may be greater than two, and where like numbers reference components common to the bidirectional converters 18 and 190 of FIGS. 2 and 9, respectively. As compared to the bidirectional converters 18 and 190, the converter 200 may produce less ripple on the voltages $V_1$ and $V_2$, and may have a smaller current per phase for a given output/input current. Such an N-phase structure may be a promising candidate for high-power applications.

The converter 200 includes a first converter stage 202, a second converter stage 204, and transformers $24_1$-$24_{N/2}$.

The first stage 202 includes the capacitor 62 and a number of two-phase substages 206 that may each have a topology and operation that are respectively similar to the topology and operation of the first converter stage 20 of FIG. 2.

The second converter stage 204 includes N/2 half-bridges each formed from a respective pair of transistors $64_1$-$64_{N/2}$ and $68_1$-$68_{N/2}$, and the capacitor 72.

The transformers $24_1$-$24_{N/2}$ may each have a respective core, or may share a common core.

Alternate embodiments of the bidirectional converter 200 are contemplated. For example, the second stage 204 may include a voltage multiplier, such as, for example, a voltage doubler similar to that formed by the capacitors 194 and 196 of FIG. 9. Furthermore, one or more of the transistors 64 and 68 may be replaced with a diode.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A bidirectional converter, comprising:
first and second converter nodes;
a transformer having first and second windings;
a first stage coupled between the first converter node and the first winding of the transformer; and
a second stage having a first node coupled to the second converter node, having a second node coupled to a node of the second winding of the transformer, having a filter node, configured to operate as a boost converter while current is flowing out from the second converter node, and configured to operate as a buck converter while current is flowing out from the first converter node.

2. The bidirectional converter of claim 1 wherein the first winding of the transformer includes only first and second nodes.

3. The bidirectional converter of claim 1 wherein the second winding of the transformer includes only first and second nodes.

4. The bidirectional converter of claim 1 wherein the first winding of the transformer has approximately a same number of turns as the second winding of the transformer.

5. The bidirectional converter of claim 1, further comprising:
a reference node; and
wherein the first stage includes a half-bridge circuit coupled between the first converter node and the reference node and having an intermediate node coupled to the first winding of the transformer.

6. The bidirectional converter of claim 5 wherein the half-bridge circuit includes:
a first transistor coupled between the first converter node and the intermediate node; and
a second transistor coupled between the intermediate node and the reference node.

7. The bidirectional converter of claim 5 wherein the half-bridge circuit includes:
a first diode coupled between the first converter node and the intermediate node; and
a second diode coupled between the intermediate node and the reference node.

8. The bidirectional converter of claim 1, further comprising:
a reference node; and
wherein the first stage includes
a first half-bridge circuit coupled between the first converter node and the reference node and having an intermediate node coupled to a first node of the first winding of the transformer; and
a second half-bridge circuit coupled between the first converter node and the reference node and having an intermediate node coupled to a second node of the first winding of the transformer.

9. The bidirectional converter of claim 1, further comprising:
a reference node; and
wherein the first stage includes
a first half-bridge circuit coupled between the first converter node and the reference node and having an intermediate node coupled to a first node of the first winding of the transformer;
a first capacitor coupled between the first converter node and a second node of the first winding of the transformer; and
a second capacitor coupled between the reference node and the second node of the first winding of the transformer.

10. The bidirectional converter of claim 1, further comprising:
a reference node; and
wherein the second stage includes:
an inductor having a first node coupled to the second converter node and having a second node;
a first switch coupled between the reference node and the second node of the inductor; and
a second switch coupled between the filter node and the second node of the inductor.

11. The bidirectional converter of claim 10 wherein the first and second switches respectively include first and second transistors.

12. The bidirectional converter of claim 1, further comprising:
a reference node; and
wherein the second stage includes:
a first inductor having a first node coupled to the second converter node and having a second node;
a second inductor having a first node coupled to the second converter node and having a second node;
a first switch coupled between the reference node and the second node of the first inductor;
a second switch coupled between the filter node and the second node of the first inductor;
a third switch coupled between the reference node and the second node of the second inductor; and
a fourth switch coupled between the filter node and the second node of the second inductor.

13. The bidirectional converter of claim 1, further comprising:
a reference node; and
a filter coupled between the filter node and the reference node.

14. The bidirectional converter of claim 1, further comprising:
a reference node; and
a capacitor coupled between the filter node and the reference node.

15. The bidirectional converter of claim 1, further comprising:
a reference node; and
a capacitor coupled between the first converter node and the reference node.

16. The bidirectional converter of claim 1, further comprising a controller coupled to the first and second stages.

17. The bidirectional converter of claim 1, further comprising:
a package; and
wherein the first and second converter nodes, transformer, first stage, and second stage are disposed in the package.

18. A system, comprising:
a bidirectional converter, including
first and second converter nodes;
a transformer having first and second windings;
a first stage coupled between the first converter node and the first winding of the transformer; and
a second stage having a first node coupled to the second converter node, having a second node coupled to a node of the second winding of the transformer, having a filter node, configured to operate as a boost converter while current is flowing out from the second converter node, and configured to operate as a buck converter while current is flowing out from the first converter node;

a filter coupled to the filter node; and a controller coupled to the first and second stages.

19. The system of claim 18, further comprising:

a reference node; and a battery coupled between the first converter node and the reference node.

20. The system of claim 18, further comprising:

a reference node; and a battery coupled between the second converter node and the reference node.

21. The system of claim 18, further comprising a generator coupled to the first converter node.

22. The system of claim 18, further comprising a load coupled to the first converter node.

23. The system of claim 18, further comprising a motor coupled to the first converter node.

24. The system of claim 18, further comprising:

an automobile wheel; and a motor-generator mechanically coupled to the wheel and electrically coupled to the first converter node.

* * * * *